US006741793B1

(12) United States Patent
Sugiyama

(10) Patent No.: US 6,741,793 B1
(45) Date of Patent: May 25, 2004

(54) DATA TRANSMITTING APPARATUS AND METHOD THEREOF, RECORDING APPARATUS, AND RECORDING AND REPRODUCING APPARATUS

(75) Inventor: Akira Sugiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/512,732

(22) Filed: Feb. 24, 2000

(30) Foreign Application Priority Data

Feb. 26, 1999 (JP) .......................................... 11-051596

(51) Int. Cl.[7] ............................................... H04N 5/91
(52) U.S. Cl. .......................... 386/68; 386/124; 386/131
(58) Field of Search .............................. 386/68, 69, 70, 386/46, 109, 110, 124, 125, 126, 131; H04N 5/91

(56) References Cited

U.S. PATENT DOCUMENTS

| 4,706,133 A | * | 11/1987 | Giddings | ..................... 386/125 |
| 5,377,051 A | * | 12/1994 | Lane et al. | .................. 386/124 |
| 5,479,299 A | * | 12/1995 | Matsumi et al. | ............ 386/112 |
| 5,497,244 A | * | 3/1996 | Chargin et al. | ............. 386/109 |
| 5,621,578 A | * | 4/1997 | Matsumi et al. | ............ 386/124 |
| 5,828,808 A | | 10/1998 | Kang | |
| 5,850,263 A | | 12/1998 | Tauchi | |

FOREIGN PATENT DOCUMENTS

GB 2 324 925 11/1998

* cited by examiner

Primary Examiner—Vincent Boccio
(74) Attorney, Agent, or Firm—Frommer Lawrence & Haug LLP; William S. Frommer

(57) ABSTRACT

A data transmitting apparatus for transmitting video data that has been compression-encoded is disclosed, that comprises a record medium on which the video data has been recorded, a reproducing means for reading the video data from the record medium in the different direction on the time axis from the video data that has been recorded, and a transmitting means for generating information that represents that the video data has been read from the record medium in the different direction when the video data is read from the record medium by the reproducing means in the different direction, placing the generated information to a data stream of the video data, and transmitting the resultant data stream.

13 Claims, 16 Drawing Sheets

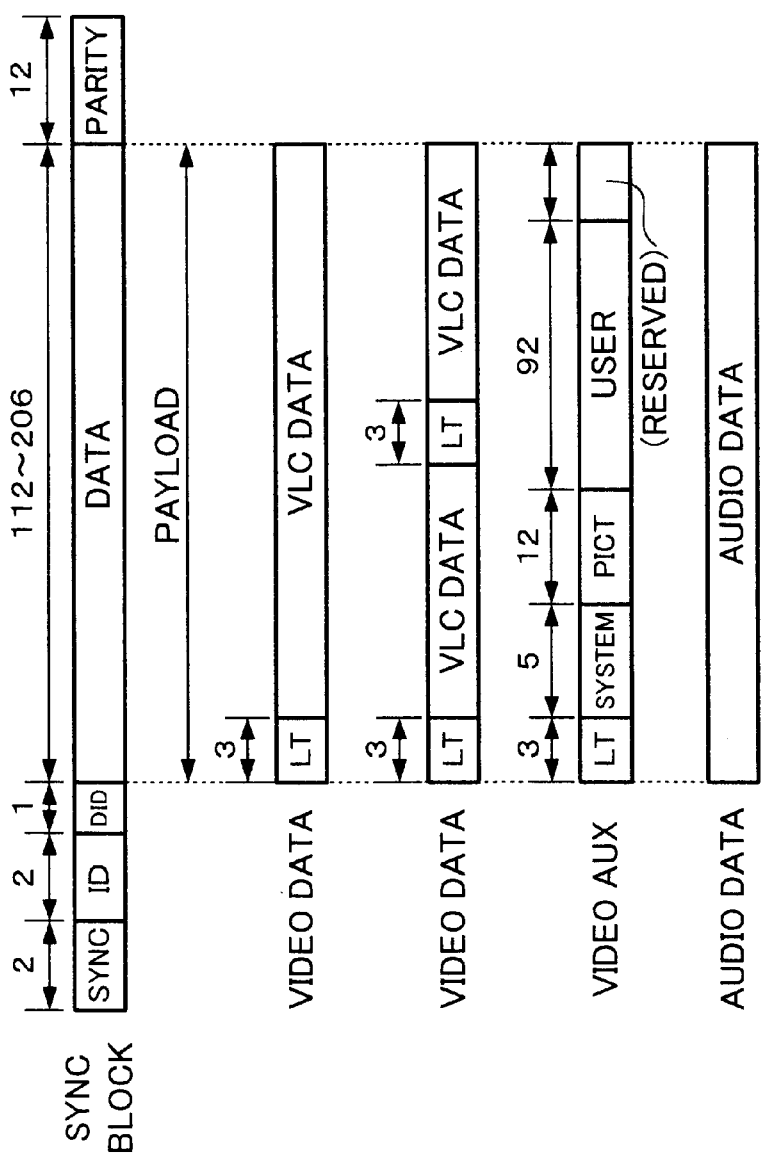

Fig. 6A

| MSB | ID0 | ID1 |
|---|---|---|
| 7 | SYNC ID7 | Upper/Lower |
| 6 | SYNC ID6 | (Reserrvel) |
| 5 | SYNC ID5 | SEG NB3 |
| 4 | SYNC ID4 | SEG NB2 |
| 3 | SYNC ID3 | SEG NB1 |
| 2 | SYNC ID2 | SEG NB0 |
| 1 | SYNC ID1 | TRACK |
| 0 | SYNC ID0 | VIDEO/AUDIO |

LSB

Fig. 6B

| DID(VIDEO) |
|---|
| (Reserrvel) |
| (Reserrvel) |
| (Reserrvel) |
| (Reserrvel) |
| PAYLOAD MD1 |
| PAYLOAD MD0 |
| 2MB/1MB |
| Vouter |

Fig. 6C

| DID(AUDIO) |
|---|
| (Reserrvel) |
| (Reserrvel) |
| (Reserrvel) |
| (Reserrvel) |
| DATA/AUDIO |
| 5F Seg2 |
| 5F Seg1 |
| 5F Seg0 |

Fig. 7A

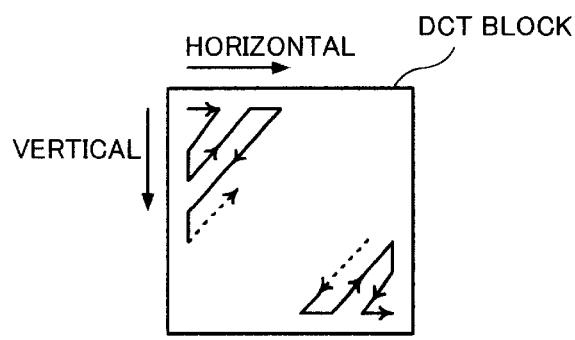

Fig. 7B

```
 0                                                           63
 | 8 5  0 0 3  0 0 1  0 0 9  ···  0 0 0  ······  0 |
  └┘ └┘ └───┘  └───┘  └───┘
  DC AC₁  AC₂    AC₃    AC₄    (EOB)
```

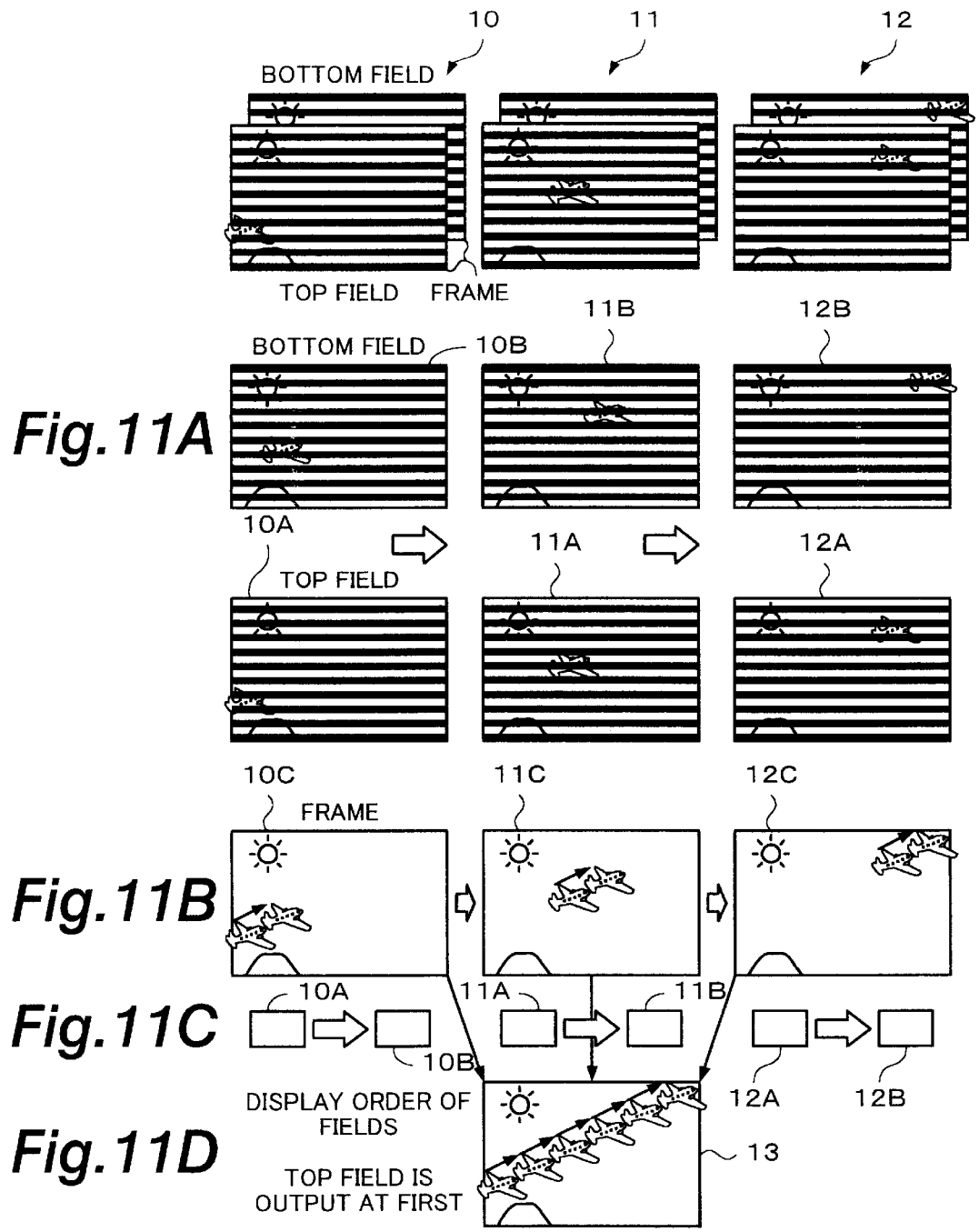

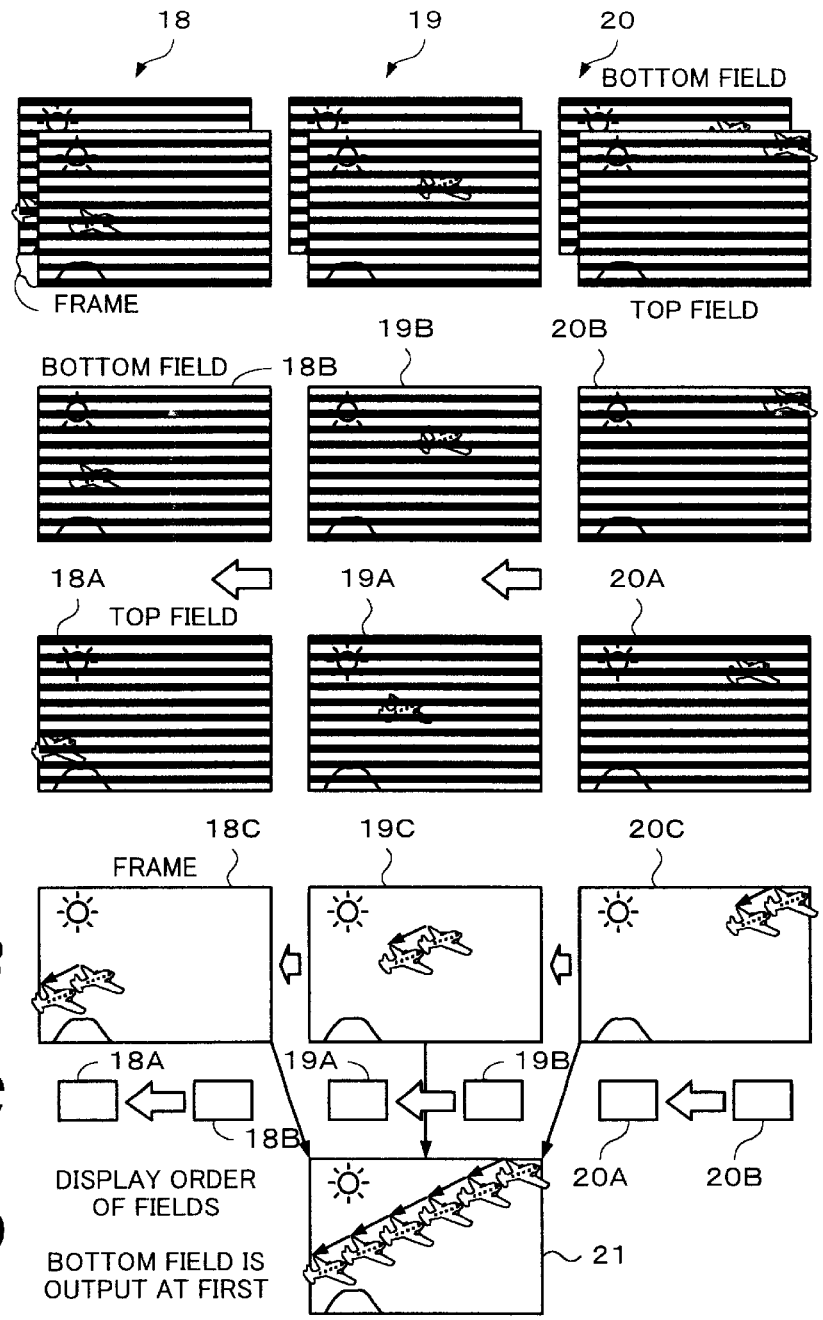

DATA TRANSMITTING APPARATUS AND METHOD THEREOF, RECORDING APPARATUS, AND RECORDING AND REPRODUCING APPARATUS

BACKGROUND OF THE INVENTION

1. Field of the Invention

The present invention relates to a data transmitting apparatus, a method thereof, a recording apparatus, and a recording and reproducing apparatus 2. Description of the Related Art Recently, MPEG2 (Moving Picture Experts Group 2) has been used as the mainstream of video data compression-encoding methods. According to MPEG2, each field or each frame of interlaced video data is encoded corresponding to DCT (Discrete Cosine Transform). In addition, between fields or between frames, a motion compensation predictive encoding process is performed.

Video data that has been compression-encoded is recorded to for example a magnetic tape. The video data are recorded as helical tracks on the magnetic tape by a rotating head that is rotated at a predetermined speed. One frame of video data is recorded on a plurality of successive tracks. Two fields that compose one frame are dispersed on the plurality of tracks. In other words, the fields are interleaved. Video data is reproduced from the plurality of tracks at a time. Thus, dispersed fields of each frame are restored.

Now, the case of which video data that has been compression-encoded corresponding to MPEG2 and recorded on a particular record medium is reproduced and transmitted to an external device will be described. Conventionally, video data that has been compression-encoded corresponding to MPEG2 is temporarily decoded to the original video data. The original video data is transmitted to an external device. The external device performs an editing process for the received video data, performs a compression-encoding process for the edited video data, and records the encoded data to a predetermined record medium.

When video data that has been compression-encoded is temporarily decoded, transmitted, compression-encoded, and then recorded, the picture quality of video data deteriorates as the signal deteriorates. In addition, to transmit the decoded video data, the frequency band of the transmission path should be widened. Thus, there are needs to transmit video data that has been compression-encoded.

Conventionally, as with a VCR (Video Cassette Recorder), when a reverse reproducing operation of which video data that has been compression-encoded is reproduced in the reverse direction on the time axis of the recording operation is performed, a frame memory for changing the display order of fields is used. In other words, decoded video data is stored in the frame memory. The first field (the top field on the time axis) and the second field (the bottom field on the time axis) are read in the reverse order. Thus, when the reverse reproducing operation is performed, video data is smoothly and naturally displayed.

On the other hand, when video data that has been compression-encoded is reversely reproduced, transmitted to an external device, decoded by the external device, and then displayed on a monitor, it is necessary to inform the external device that the video data has been reversely reproduced. This is because the external device cannot determine whether the video data has been reversely reproduced.

In other words, as described above, video data that has been compression-encoded is field-interleaved and recorded frame by frame to a magnetic tape. When video data is reversely reproduced, the order of frames is different from the recording operation. However, the order of fields is the same as the recording operation. Consequently, since fields are reproduced in the different direction from frames, the resultant picture is unnaturally displayed.

Thus, when video data that has been compression-encoded corresponding to MPEG2 and recorded on a record medium is reversely reproduced, transmitted to an external device through a transmission path, and then decoded and reproduced by the external device, it should be informed that the video data has been reversely reproduced.

In particular, if video data that has been compression-encoded contains forwardly reproduced data and reversely reproduced data, information that represents the relation between frames and forward/reverse reproducing operations is required. Otherwise, the display order of the top field and bottom field of received video data cannot be changed with the frame memory on real time basis.

OBJECTS AND SUMMARY OF THE INVENTION

An object of the present invention is to provide a data transmitting apparatus, a method thereof, a recording apparatus, and a recording and reproducing apparatus that allow video data that has been compression-encoded and reversely reproduced to be naturally reproduced in the reverse direction.

A first aspect of the present invention is a data transmitting apparatus for transmitting video data that has been compression-encoded, comprising a record medium on which the video data has been recorded, a reproducing means for reading the video data from the record medium in the different direction on the time axis from the video data that has been recorded, and a transmitting means for generating information that represents that the video data has been read from the record medium in the different direction when the video data is read from the record medium by the reproducing means in the different direction, placing the generated information to a data stream of the video data, and transmitting the resultant data stream.

A second aspect of the present invention is a recording apparatus for recording video data that has been compression-encoded to a record medium, comprising a receiving means for receiving a data stream of the video data, an inverting means for inverting a flag that represents the display order of fields of the video data, the flag being placed in the data stream, and a recoding means for recoding the data stream with the inverted flag to the record medium.

A third aspect of the present invention is a recording and reproducing apparatus for recording video data that has been compression-encoded to a record medium and reproducing that video data from the record medium, comprising a recording means for recording the video data to the record medium, a reproducing means for reproducing the video data from the record medium in the different direction on the time axis from the video data that has been recorded, and a transmitting means for generating information that represents that the video data has been read from the record medium in the different direction when the video data is read from the record medium by the reproducing means in the different direction, placing the generated information to a data stream of the video data, and transmitting the resultant data stream.

A fourth aspect of the present invention is a data transmitting method for transmitting video data that has been compression-encoded, comprising the steps of (a) recording the video data to a record medium, (b) reproducing the video data from the record medium in the different direction on the time axis from the video data that has been recorded, and (c) generating information that represents that the video data has been read from the record medium in the different direction when the video data is read from the record medium at step (b) in the different direction, placing the generated information to a data stream of the video data, and transmitting the resultant data stream.

These and other objects, features and advantages of the present invention will become more apparent in light of the following detailed description of a best mode embodiment thereof, as illustrated in the accompanying drawings.

BRIEF DESCRIPTION OF THE DRAWINGS

FIGS. 5A, 5B, 5C, 5D, and 5E are schematic diagrams showing a plurality of examples of the structures of sync blocks;

FIGS. 6A, 6B, and 6C are schematic diagrams showing the contents of an ID and a DID added to sync blocks;

FIGS. 7A and 7B are schematic diagrams for explaining an output method and a variable length code encoding process of a video encoder;

FIGS. 11A, 11B, 11C, and 11D are schematic diagrams showing an example of which interlaced video data is reproduced in the same direction on the time axis as the recording operation;

FIGS. 13A, 13B, 13C, and 13D are schematic diagrams showing an example of which interlaced video data is reproduced in the reverse direction according to a controlling method of the present invention;

DETAILED DESCRIPTION OF THE PREFERRED EMBODIMENTS

Figure 1:
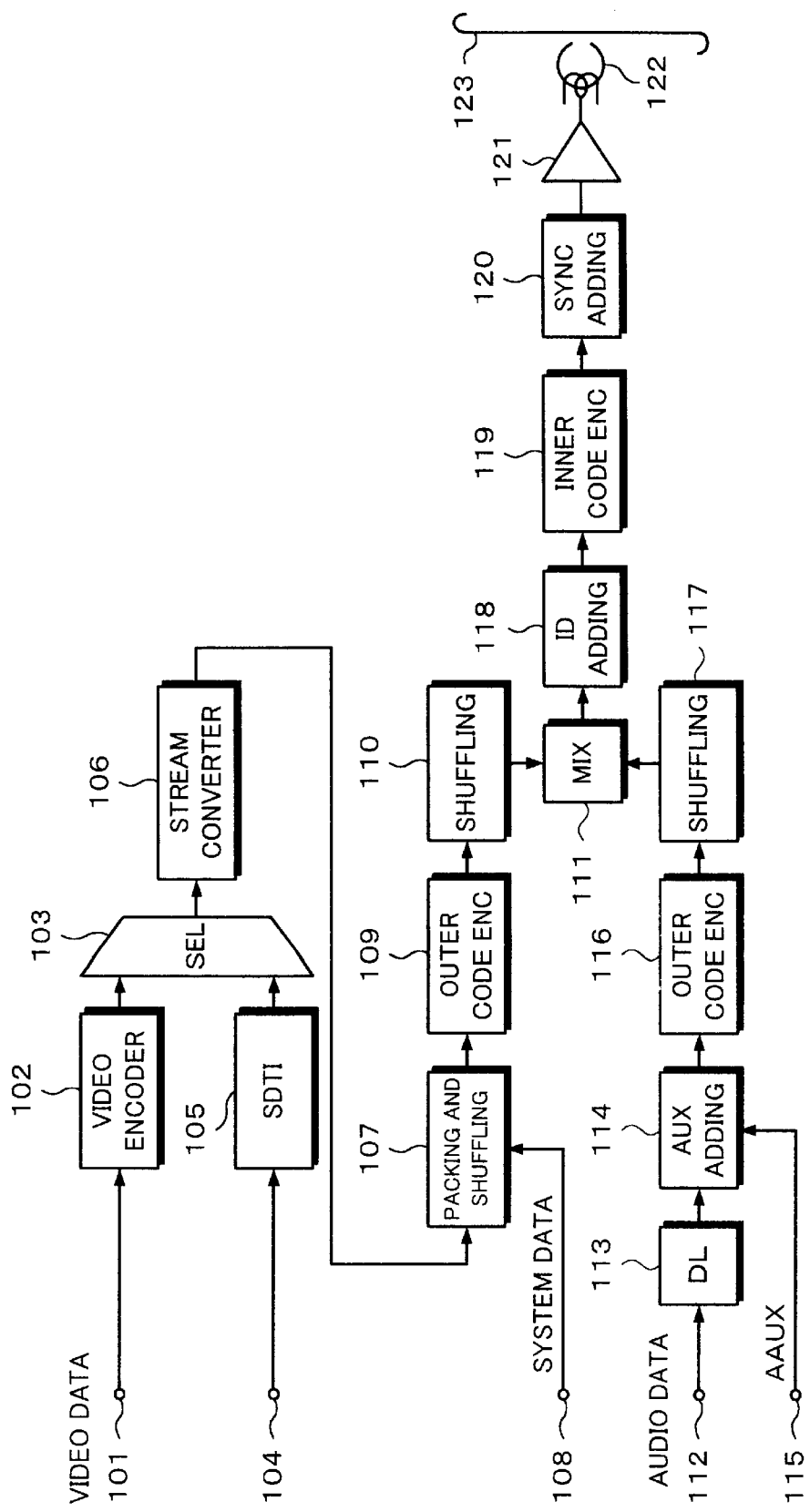
FIG. 1 is a block diagram showing the structure of a recording side of a recording and reproducing apparatus according to an embodiment of the present invention.

Next, an embodiment of the present invention will be described. In the embodiment, video data is compression-encoded corresponding to MPEG2. In the embodiment, whenever video data is reversely reproduced, a flag "top__field__first" (hereinafter referred to as flag TFF) that is contained in MPEG2 encoded data is inverted so as to inform an external device that the video data has been reversely reproduced. The flag TFF is contained in "picture__coding__extension" of the data structure of MPEG2.

According to MPEG2, the flag TFF is one-bit data and represents whether the first field of each frame is a top field or a bottom field. In other words, the flag TFF represents whether the first reproduced field that is output in the decoding process is a top field or a bottom field. In the frame structure, when the flag TFF is set to [1], it represents that the top field of the reproduced frame is the first field that is output in the decoding process. In the field structure, the flag TFF is always set to [0]

For easy understanding, first of all, a recording and reproducing apparatus according to an embodiment of the present invention will be described. The recording and reproducing apparatus according to the embodiment is suitably used in the environment of a broadcasting station. The digital VCR can record and reproduce video signals in a plurality of formats. For example, the digital VCR can record and reproduce an NTSC interlace-scanned 480-line signal (hereinafter referred to as 480i signal) and a PAL interlace-scanned 576-line signal (hereinafter referred to as 576i signal) without need to change the hardware. In addition, the digital VCR can record and reproduce an interlace-scanned 1080-line signal (hereinafter referred to as 1080i signal), a progressive noninterlace-scanned 480-line signal (hereinafter referred to as 480p signal), a progressive noninterlace-scanned 720-line signal (hereinafter referred to as 720p signal), and a progressive noninterlace-scanned 1080-line signal (hereinafter referred to as 1080p signal).

In the recording and reproducing apparatus, a video signal is compression-encoded corresponding to the MPEG2 standard. As well known, the MPEG2 standard is a combination of a motion compensation predictive encoding process and a DCT compression encoding process. The data structure of the MPEG2 standard is a hierarchical structure having a block layer (lowest layer), a macro block layer, a slice layer, a picture layer, a GOP layer, and a sequence layer (highest layer).

The block layer is composed of DCT blocks. The DCT process is performed for each DCT block. The macro block layer is composed of a plurality of DCT blocks. The slice layer is composed of a header portion and any number of macro blocks that are placed on one line, not on two lines. The picture layer is composed of a header portion and a plurality of slices. One picture is equivalent to one screen. The GOP (Group Of Picture) layer is composed of a header portion, an I picture (as an intra-frame coded picture), a P picture (as a predictively coded picture), and a B picture (as a bidirectionally predictively coded picture).

When an I picture is encoded, only the information thereof is used. Thus, the I picture is decoded with the information thereof. A P picture uses an I picture or a P picture that has been decoded as a predictive picture that is a reference picture for obtaining the difference. The difference between the P picture and the motion-compensated predictive picture is encoded. Alternatively, the P picture is encoded. One of these methods is selected whichever effective for each macro block. A B picture uses three types of pictures as predictive pictures that are an I picture or a P picture that has been decoded before the B picture, an I picture or a P picture that has been decoded after the B picture, and an interpolated picture created by these two pictures. The difference between the B picture and each of the three types of pictures that have been motion-compensated is encoded. Alternatively, the B picture is intra-encoded. One of these methods is selected whichever effective for each macro block.

Thus, there are four types of macro blocks that are an intra frame coded macro block, a forward inter frame predictive macro block (a future macro block is predicted with a past macro block), a backward inter frame predictive macro block (a past macro block is predicted with a future macro block), and a bidirectional macro block (the current macro block is predicted in both forward and backward directions). All macro blocks of an I picture are intra frame coded macro blocks. A P picture contains intra frame coded macro blocks and forward inter frame predictive macro blocks. A B picture contains all the four types of macro blocks.

Each GOP contains at least one I picture. In other words, each GOP may not contain a P picture and/or a B picture. The sequence layer (which is the highest layer) is composed of a header portion and a plurality of GOPs.

In the MPEG format, a slice is one variable length code sequence. The variable length code sequence is a sequence of which the boundary of data cannot be detected unless a variable length code is decoded.

At the beginning of each of the sequence layer, the GOP layer, the picture layer, and the slice layer, an identification code having a predetermined bit pattern as a byte is placed. The identification code is referred to as start code. The header portion of each layer contains a header, extension data, or user data. The header of the sequence layer contains the size of a picture (the number of pixels in the vertical direction and the horizontal direction). The header of the GOP layer contains a time code and the number of pictures of the current GOP.

Each of the macro blocks contained in the slice layer is a set of a plurality of DCT blocks. An encoded sequence of DCT blocks is composed in such a manner that a sequence of quantized DCT coefficients is encoded as sets of the number of 0 coefficients and a non-0 coefficient. An identification code arranged as a byte is not added to each macro block and each DCT block of each macro block. In other words, each macro block and each DCT block are not variable length code sequences.

A macro block is an element of which a picture is divided by 16 pixels×16 lines as a matrix. A slice is composed of macro blocks that are horizontally connected. The last macro block of the first slice of two successive slices and the top macro block of the second slice thereof are successive. Macro blocks that overlap between two successive slices are prohibited. The number of macro blocks depends on the size of a picture.

To prevent a signal from deteriorating in a decoding process or an encoding process, it is preferred that encoded data is edited. At this point, a P picture requires a picture that is chronologically preceded by the P picture. On the other hand, a B picture requires a picture that is chronologically preceded by the B picture and a picture that is chronologically followed by the B picture. Thus, data cannot be edited frame by frame. From this point of view, in the recording and reproducing apparatus, one GOP is composed of one I picture.

A record area of record data for one frame is predetermined. In the MPEG2 standard, since a variable length code encoding process is used, the data amount for one frame is controlled so that data generated in one frame period is recorded in the predetermined record area. In addition, in the recording and reproducing apparatus, one slice is composed of one macro block. In addition, one macro block is placed in a fixed area having a predetermined length so that data can be properly recorded to a magnetic tape.

FIG. 1 shows an example of the structure of a recording side of the recording and reproducing apparatus. When data is recorded, a digital video signal is input from a terminal 101 through a receiving portion of a predetermined interface—for example—SDI (Serial Data Interface). The SDI is an interface defined by SMPTE. With the SDI, a (4:2:2) component video signal, a digital audio video signal, and additional data are sent. The input video signal is sent to a video encoder 102. The video encoder 102 performs a DCT (Discrete Cosine Transform) process for the video signal so as to convert the video signal into coefficient data and encode the coefficient data to variable length code (VLC) data. The variable length code data supplied from the video encoder 102 is an elementary stream corresponding to the MPEG2 standard. The variable length code data is sent to one input terminal of a selector 103.

In addition, data in the format of SDTI (Serial Data Transform Interface) that is an interface defined in ANSI/SMPTE 305M is input through an input terminal 104. This signal is synchronously detected by an SDTI receiving portion 105. The signal is temporarily stored in a buffer. In the buffer, an elementary stream is extracted from the signal. The extracted elementary stream is sent to the other input terminal of the selector 103.

An elementary stream that is selected by the selector 103 is sent to a stream converter 106. The stream converter 106 arranges DCT coefficients of a plurality of DCT blocks corresponding to individual frequency components and rearranges the resultant frequency components. The rearranged elementary stream is sent to a packing and shuffling portion 107.

Since video data in the elementary stream has been encoded with a variable length code, the lengths of macro blocks are different. The packing and shuffling portion 107 packs each macro block in a fixed area. At this point, a portion that is not packed in the fixed area is successively packed in a blank portion against the size of the fixed area. System data such as a time code is supplied from an input terminal 108 to the packing and shuffling portion 107. As with picture data, the packing and shuffling portion 107 performs the recording process for the system data. The packing and shuffling portion 107 rearranges macro blocks of one frame that have taken in the scanning order and shuffles the macro blocks that are recorded on the magnetic tape. The shuffling process allows the update ratio of data that is partly reproduced in a variable speed reproducing mode to be improved.

Video data and system data (in the following description, unless noted, video data means both video data and system data) are supplied from the packing and shuffling portion 107 to an outer code encoder 109. The outer code encoder 109 uses a product code as an error correction code for the video data and the audio data. With the product code, a two-dimensional matrix of video data or audio data is encoded with an outer code in the vertical direction and with an inner code in the horizontal direction. Thus, data symbols are encoded two times. As the outer code and the inner code, Reed-Solomon code can be used.

Output data of the outer code encoder 109 is supplied to a shuffling portion 110. The shuffling portion 110 shuffles sync blocks of a plurality of ECC (error correction code) blocks. Thus, an error can be prevented from concentrating on a particular ECC block. The shuffling process performed by the shuffling portion 110 may be referred to as interleaving process. Output data of the shuffling portion 110 is supplied to a mixing portion 111. The mixing portion 111 mixes the output data of the shuffling portion 110 with audio data. As will be described later, the mixing portion 111 is composed of a main memory.

Audio data is received from an input terminal 112. In the recording and reproducing apparatus, a non-compressed digital audio signal is handled. The digital audio signal is separated by an SDI receiving portion (not shown) of the input side or an SDTI receiving portion 105. Alternatively, the digital audio signal is input through an audio interface. The input digital audio signal is supplied to an AUX adding portion 114 through a delaying portion 113. The delaying portion 113 matches the phase of the audio signal with the phase of the video signal. Audio AUX received from an input terminal 115 is auxiliary data having information in association with audio data such as sampling frequency thereof. The AUX adding portion 114 adds the audio AUX to audio data. The audio AUX is treated in the same manner as audio data.

Audio data and AUX data (in the following description, unless noted, audio data means both audio data and AUX data) are supplied to an outer code encoder 116. The outer code encoder 116 encodes audio data with an outer code. Output data of the outer code encoder 116 is supplied to a shuffling portion 117. The shuffling portion 117 shuffles the output data of the outer code encoder 116. The shuffling portion 117 shuffles audio data for each sync block or for each channel.

Output data of the shuffling portion 117 is supplied to the mixing portion 111. The mixing portion 111 mixes the video data and the audio data as data of one channel. Output data of the mixing portion 111 is supplied to an ID adding portion 118. The ID adding portion 118 adds an ID having information that represents a sync block number to the output data of the mixing portion 111. Output data of the ID adding portion 118 is supplied to an inner code encoder 119. The inner code encoder 119 encodes the output data of the ID adding portion 118 with an inner code. Output data of the inner code encoder 119 is supplied to a synchronization adding portion 120. The synchronization adding portion 120 adds a synchronous signal to each sync block. Thus, sync blocks are structured as successive record data. The record data is supplied to a rotating head 122 through a recording amplifier 121 and recorded on a magnetic tape 123. Actually, the rotating head 122 is composed of a plurality of magnetic heads with different azimuths and a rotating drum on which the magnetic heads are disposed.

When necessary, a scramble process may be performed for record data. In addition, when data is recorded, it may be digital-modulated. Moreover, partial response class 4 and Viterbi encoding process may be used.

Figure 2:
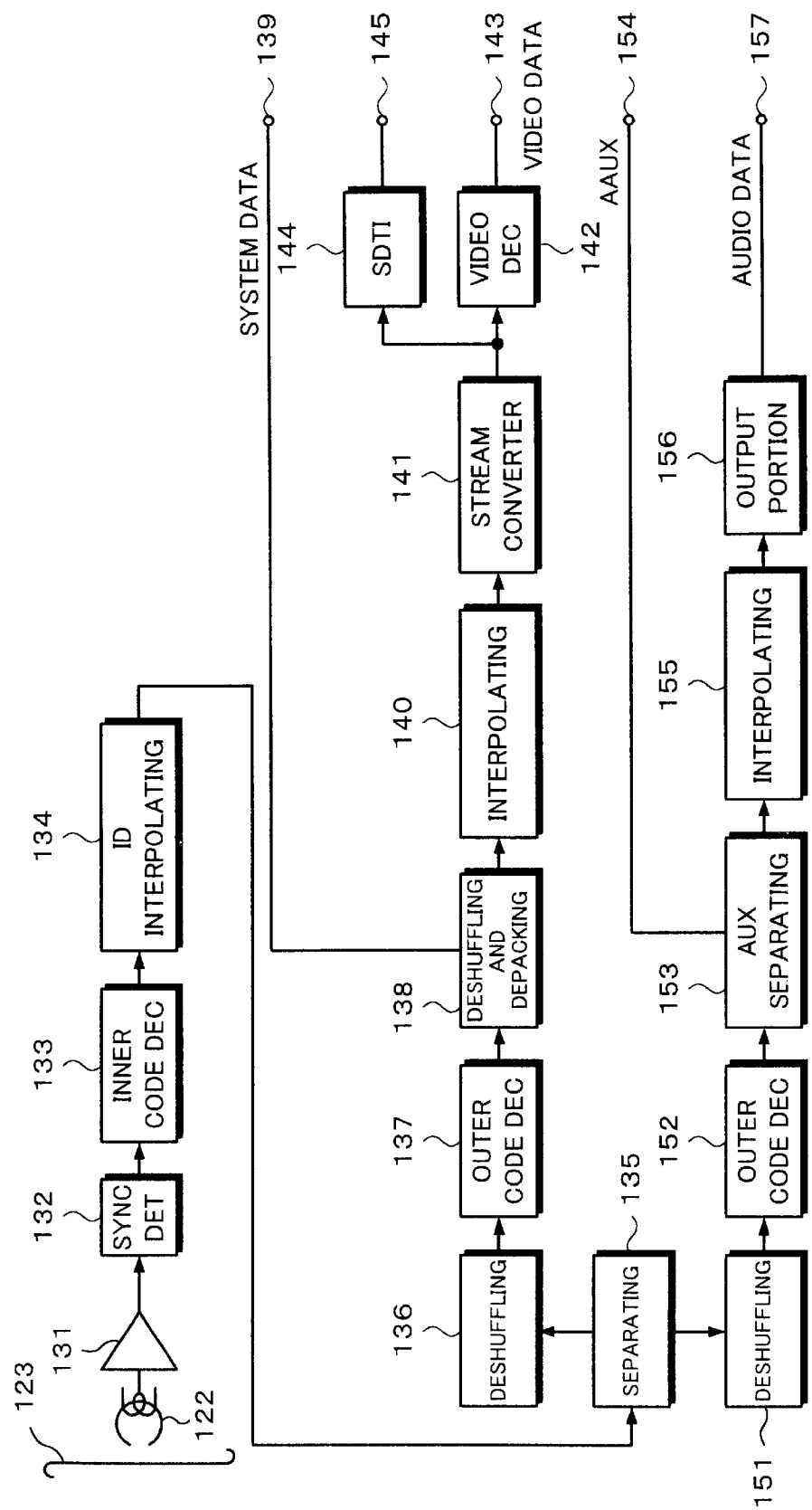
FIG. 2 is a block diagram showing the structure of a reproducing side of the recording and reproducing apparatus according to the embodiment of the present invention.

FIG. 2 shows an example of the structure of a reproducing side of the recording and reproducing apparatus according to the present invention. A signal reproduced from a magnetic tape 123 by a rotating head 122 is supplied to a synchronization detecting portion 132 through a reproducing amplifier 131. An equalizing process and a waveform trimming process are performed for the reproduction signal. When necessary, a digital demodulating process and Viterbi decoding process are performed. The synchronization detecting portion 132 detects a synchronous signal at the beginning of a sync block and extracts the sync block.

Output data of the synchronization detecting portion 132 is supplied to an inner code decoder 133. The inner code decoder 133 corrects an error of the output data of the synchronization detecting portion 132 with an inner code. Output data of the inner code decoder 133 is supplied to an ID compensating portion 134. The ID interpolating portion 134 interpolates an ID (for example, a sync block number) of a sync block of which an error has been detected with an inner block. Output data of the ID interpolating portion 134 is supplied to a separating portion 135. The separating portion 135 separates the output data of the ID interpolating portion 134 into video data and audio data. As described above, the video data contains DCT coefficient data generated in the MPEG intra-encoding process and system data. Likewise, the audio data contains PCM (Pulse Code Modulation) data and AUX data.

A deshuffling portion 136 deshuffles video data received from the separating portion 135. The deshuffling portion 136 restores shuffled sync blocks shuffled by the shuffling portion 110 on the recording side to original sync blocks. Output data of the deshuffling portion 136 is supplied to an outer code decoder 137. The outer code decoder 137 corrects an error of output data of the deshuffling portion 136 with an outer code. When an error of the data cannot be corrected, an error flag is placed thereto.

Output data of the outer code decoder 137 is supplied to a deshuffling and depacking portion 138. The deshuffling and depacking portion 138 deshuffles macro blocks that have been shuffled by the packing and shuffling portion on the recording side. In addition, the deshuffling and depacking portion 138 performs a depacking process for data that has been packed on the recording side. In other words, the deshuffling and depacking portion 138 restores fixed length macro blocks to original variable length codes. Moreover, the deshuffling and depacking portion 138 separates system data from the output data of the outer code decoder 137. The system data is obtained from an output terminal 139.

Output data of the deshuffling and depacking portion 138 is supplied to an interpolating portion 140. The interpolating portion 140 corrects data that has an error flag. When a macro block has an error, DCT coefficients of frequency components of the rest of the macro block cannot be restored. In this case, data having an error is substituted with an EOB (End Of Block). DCT coefficients of frequency components after the EOB are set to zero. Likewise, in the high speed reproducing mode, only DCT coefficients corresponding to the length of a sync block are restored. DCT coefficients after the sync block are substituted with zero data. When a header (a sequence header, a GOP header, a picture header, user data, or the like) at the beginning of video data has an error, the interpolating portion 140 restores the header.

Since DCT coefficients of a plurality of DCT blocks are arranged in the order from DC components and from the lowest frequency component to the highest frequency component, even if DCT coefficients after a particular position are ignored, DCT coefficients of DC components and low frequency components can be placed in each of DCT blocks that compose a macro block.

Output data of the interpolating portion 140 is supplied to a stream converter 141. The stream converter 141 performs an inverse process of the process of the stream converter 106 on the recording side. In other words, the stream converter 141 rearranges DCT coefficients arranged in the order of frequency components in DCT blocks to DCT coefficients in the order of DCT blocks. Thus, the reproduction signal is converted into an elementary stream corresponding to the MEPG2 standard.

An input signal and an output signal of the stream converter 141 have sufficient transmission rates (band widths) corresponding to the maximum length of macro blocks. When the length of macro blocks is not limited, it is preferred to secure a band width that is three times larger than the pixel rate.

Output data of the stream converter 141 is supplied to a video decoder 142. The video decoder 142 decodes an elementary stream and outputs video data. In other words, the video decoder 142 performs a dequantizing process and an inverse DCT process. Decoded video data is obtained from an output terminal 143. As an interface to the outside of the apparatus, for example SDI is used. In addition, the stream converter 141 also supplies an elementary stream to an SDTI transmitting portion 144. System data, reproduction audio data, and AUX data are also supplied to the SDTI transmitting portion 144 through relevant paths (not shown). The SDTI transmitting portion 144 converts these signals into an SDTI format stream. The stream is supplied from the SDTI transmitting portion 144 to the outside of the apparatus through an output terminal 145.

Audio data separated by the separating portion 135 is supplied to a deshuffling portion 151. The deshuffling portion 151 performs an inverse process of the shuffling portion 117 on the recording side. Output data of the deshuffling portion 117 is supplied to an outer code decoder 152. The outer code decoder 152 corrects an error of the output signal of the deshuffling portion 117 with an outer code. The outer code decoder 152 outputs audio data whose error has been corrected. When an error of the audio data cannot be corrected, an error flag is set thereto.

Output data of the outer code decoder 152 is supplied to an AUX separating portion 153. The AUX separating portion 153 separates audio AUX from the output data of the outer code decoder 152. The separated audio AUX is obtained from an output terminal 154. The separated audio data is supplied to an interpolating portion 155. The interpolating portion 155 interpolates a sample having an error. As an interpolating method, a mean value interpolating method of which a particular sample is interpolated with the mean value of a correct sample followed by the particular sample and a correct sample preceded by the particular sample can be used. Alternatively, a preceding value holding method of which the preceding correct sample value is held can be used. Output data of the interpolating portion 155 is supplied to an output portion 156. The output portion 156 performs a mute process, a delay amount adjusting process, and so forth. In the mute process, an audio signal having an error that cannot be compensated is prohibited from being output. In the delay amount adjusting process, the phase of the audio signal is matched with the phase of the video signal. The output portion 156 supplies the reproduction audio signal to an output terminal 157.

The reproducing side also has a timing generating portion, a system controller (that is a microcomputer), and so forth (they are not shown in FIGS. 1 and 2). The timing generating portion generates a timing signal in synchronization with input data. The system controller controls the entire operations of the recording and reproducing apparatus.

In the recording and reproducing apparatus, signals are recorded on a magnetic tape by helical scan method. In the helical scan method, inclined tracks are formed by magnetic heads disposed on a rotating head. A plurality of heads are disposed at opposite positions on the rotating drum. In the case that a magnetic tape is wound to the rotating head with a winding angle of around 180°, when the rotating head is turned by 180°, a plurality of tracks can be formed at a time. Two magnetic heads with different azimuths are disposed as one set on the rotating drum so that adjacent tracks have different azimuths.

Figure 3:
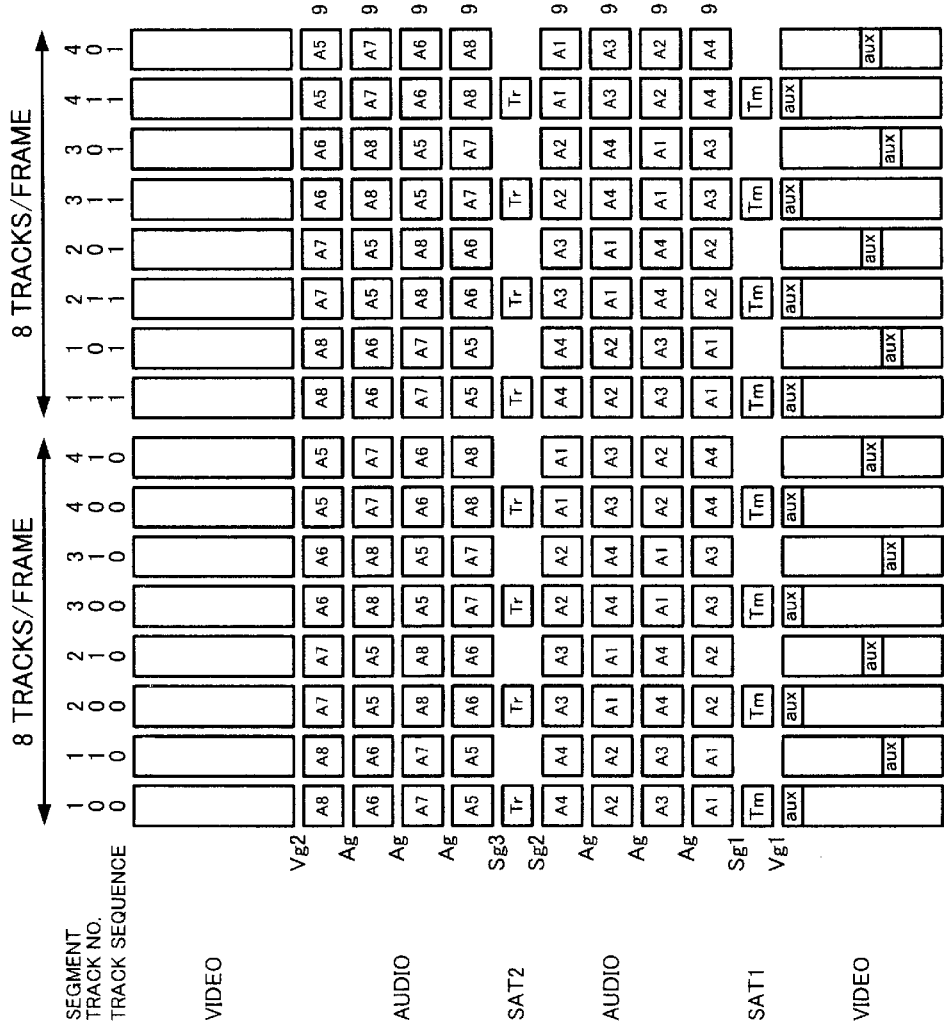
FIG. 3 is a schematic diagram showing an example of a track format.

FIG. 3 shows an example of the track format formed on a magnetic tape by the above-described rotating head. In this example, video data and audio data for one frame are recorded with eight tracks. For example, the 480i video signal of which the frame frequency is 29.97 Hz, the data rate is 50 Mbps, the number of effective lines is 480, and the number of effective horizontal pixels is 720 is recorded along with an audio signal. In addition, the 576i video signal of which the frame frequency is 25 Hz, the data rate is 50 Mbps, the number of effective lines is 576, and the number of effective horizontal pixels is 720 can be recorded along with an audio signal in the tape format shown in FIG. 3.

One segment is formed of two tracks with different azimuths. In other words, eight tracks are composed of four segments. A pair of tracks that form a segment are designated track number [0] and track number [1] corresponding to azimuths. In the example shown in FIG. 3, the track numbers of the first eight tracks are different from those of the second eight tracks. A unique track sequence is assigned to each frame. Thus, even if one of paired magnetic heads cannot read a signal due to clogging or the like, data of the preceding frame can be used. Thus, the influence of the error can be minimized.

Video sectors are formed on both edge sides in the longitudinal direction of each track. An audio sector for audio data is formed between the video sectors. FIGS. 3 and 4 also show positions of audio sectors on a tape.

In the track format shown in FIG. 3, audio data of eight channels can be handled. In FIG. 3, A1 to A8 represent sectors of audio data of channels 1 to 8, respectively. The positions of audio data of individual channels are varied segment by segment. In audio data, audio samples (800 samples or 801 samples in the case that the sampling frequency is 48 kHz) generated in one field period are separated into even-numbered samples and odd-numbered samples. These sample groups and AUX data compose one ECC block as a product code.

In FIG. 3, data for one field is recorded on four tracks. Thus, two ECC blocks per channel of audio data are recorded on four tracks. Data of the two ECC blocks (including an outer code parity) are divided into four sectors. As shown in FIG. 3, the divided data is dispersedly recorded on the four tracks. A plurality of sync blocks contained in the two ECC blocks are shuffled. For example, four sectors with for example reference number A1 form two ECC blocks of channel 1.

In this example, data of four ECC blocks per tack is shuffled (interleaved) and recorded to an upper side sector and a lower side sector. A system area is formed at a predetermined position of each lower side video sector.

In FIG. 3, SAT1 (Tm) and SAT2 (Tr) are areas for servo lock signals. Gaps (Vg1, Sg1, Ag, Sg2, Sg3, and Vg2) having a predetermined size each are formed between adjacent record areas.

Figure 4A:
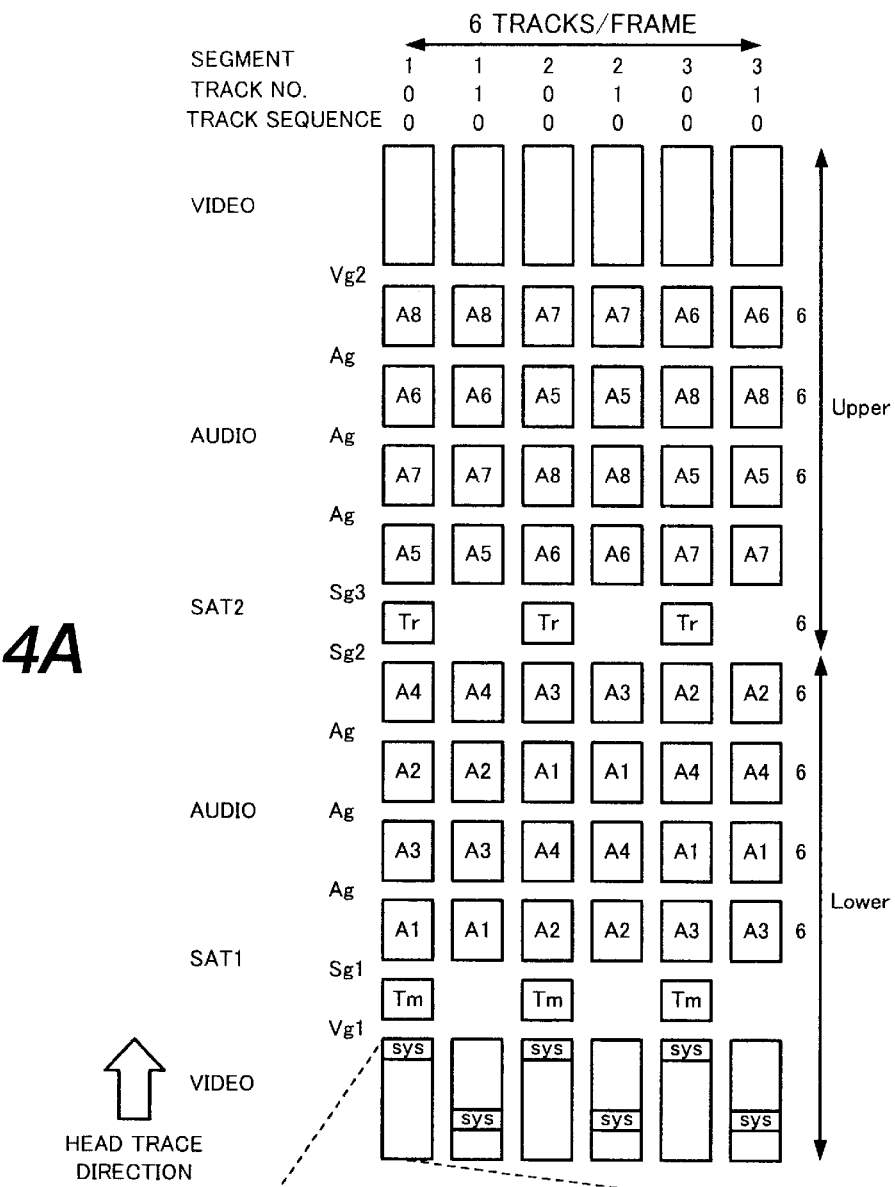
FIGS. 4A, 4B, and 4C are schematic diagrams showing another example of the track format.

In FIG. 3, data of one frame is recorded on eight tracks. However, depending on the format of record data or reproduction data, data of one frame can be recorded on four tracks or six tracks. FIG. 4A shows the format of six tracks per frame. In this example, the track sequence is only [0].

Figure 4B:
Figure 4C:
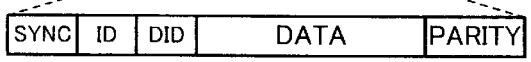

As shown in FIG. 4B, data recorded on a tape is composed of a plurality of blocks that are divided at equal intervals. The blocks are referred to as sync blocks. FIG. 4C shows an outlined structure of one sync block. As will be described later, one sync block is composed of a sync pattern, an ID, a DID, a data packet, and an error correction inner code parity. The sync pattern detects a synchronization. The ID identifies the current sync block. The DID represents the contents of data that follows. Thus, data is composed of sync blocks as packets. In other words, the minimum data unit that is recorded and reproduced is one sync block. A sequence of sync blocks (see FIG. 4B) form for example a video sector (se FIG. 4A).

FIG. 5 shows the data structure of a sync block of video data. As described above, one sync block is the minimum data unit that is recorded and reproduced. In the recording and reproducing apparatus, one sync block corresponding to the format of video data that is recorded contains data of one or two macro blocks (VLC data). The size of one sync block depends on the format of a video signal that is used. As shown in FIG. 5A, one sync block is composed of a sync pattern of two bytes, an ID of two bytes, a DID of one byte, a data area in the range from 112 bytes to 206 bytes, and a parity (that is a inner code parity) of 12 bytes that are successively arranged. The data area is also referred to as payload.

The sync pattern of two bytes is used to detect a synchronization. The sync pattern has a predetermined bit pattern. By detecting a sync pattern corresponding to a predetermined pattern, a synchronization is detected.

FIG. 6A shows examples of bit assignments of ID0 and ID1. ID1 contains important information unique to the current sync block. The data size of each of ID0 and ID1 is one byte. ID0 contains identification information (that is a sync ID) for identifying a sync block in one track. The sync ID is a serial number of a sync block of the sector. The sync ID is composed of eight bits. A sync block of video data and a sync block of audio data are designated different sync IDs.

ID1 contains track information against the current sync block. When the MSB side and the LSB side are bit 7 and bit 0, respectively, bit 7 represents whether the current sync block is present on the upper side or the lower side of the track. Bits 5 to 2 represent a segment on the track. Bit 1 represents a track number corresponding to the track azimuth. Bit 0 represents whether the current sync block is video data or audio data.

FIG. 6B shows an example of the bit assignment of the DID in the case that the data area of the current sync block is video data. The DID contains information of the payload of the current sync block. The contents of the DID depend on the value of bit 0 of the ID1. When bit 1 of the ID1 represents video data, bits 7 to 4 of the DID are reserved. Bits 3 and 2 of the DID represent the mode of the payload. The mode is for example the type of the payload. Bits 3 and 2 of the DID represent auxiliary information. Bit 1 of the DID represents whether the payload stores one or two macro blocks. Bit 0 of the DID represents whether or not video data stored in the payload is an outer code parity.

FIG. 6C shows an example of the bit assignment of the DID in the case that the data area of the current sync block is audio data. Bits 7 to 4 of the DID are reserved. Bit 3 of the DID represents whether data stored in the payload of the current sync block is audio data or conventional data. When the payload stores compression-encoded audio data, bit 3 of the DID represents data. Bits 2 to 0 of the DID stores information of NTSC five-field sequence. In other words, in the NTSC standard, when the sampling frequency is 48 kHz, one field of a video signal is equal to 800 samples or 801 samples of an audio signal. This sequence is completed every five fields. Bits 2 to 0 of the DID represents the position of the sequence.

FIGS. 5B to 5E show examples of the payload. In FIGS. 5B and 5C, the payload stores video data of one or two macro blocks (as variable length code encoded data), respectively. In FIG. 5B, the payload stores one macro block. In this case, the first three bytes of the payload contains length information LT that represents the length of the macro block that follows. The length information LT may or may not contain the length thereof. In FIG. 5C, the payload stores two macro blocks. In this case, the length information LT of the first macro block, the first macro block, the length information LT of the second macro block, and the second macro block are successively disposed. The length information LT is required to depack a macro block.

FIG. 5D shows the case that the payload stores video AUX (auxiliary) data. In FIG. 5D, at the beginning of the payload, length information LT is disposed. The length information LT represents the length of video AUX data. The length information LT is followed by system information of five bytes, PICT information of 12 bytes, and user information of 92 bytes. The remaining area of the payload is reserved.

FIG. 5E shows the case that the payload stores audio data. Audio data can be packed in all the length of the payload. The audio signal is for example a PCM signal that is not compressed. Alternatively, the audio signal may be compression-encoded corresponding to a particular method.

In the recording and reproducing apparatus, the length of the payload that is a data storage area of each sync block is optimized depending on whether the sync block is a video sync block or an audio sync block. Thus, the length of the payload of each video sync block is not equal to that of each audio sync block. In addition, the length of each video sync block and the length of each audio sync block are optimally set corresponding to the signal format for use. Thus, a plurality of different signal formats can be integrally handled.

FIG. 7A shows the order of DCT coefficients of video data that are output from a DCT circuit of an MPEG encoder. DCT coefficients are output in the order from a DC component at the upper left position of a DCT block to higher horizontal/vertical frequency components in zigzag scanning method. Thus, as shown in FIG. 7B, a total of 64 DCT coefficients (8 pixels×8 lines) are obtained in the order of frequency components.

The DCT coefficients are encoded with a variable length code by a VLC portion of the MPEG encoder. In other words, the first coefficient is a DC component that is a fixed component. The next components (AC components) are assigned codes corresponding to zero-runs and levels that follow. Thus, since the variable-length code encoded output data against coefficient data of AC components are arranged in the order from the lowest frequency component (lowest order coefficient) to the highest frequency component (highest order coefficient) such as $AC_1, AC_2, AC_3, \ldots$ An elementary stream contains the DCT coefficients that have been encoded with a variable length code.

The stream converter 106 rearranges DCT coefficients of the received signal. In other words, the stream converter 106 rearranges DCT coefficients arranged in the order of frequency components in each DCT block into DCT coefficients in the order of frequency components of all DCT blocks of the macro block.

FIG. 8 shows DCT coefficients rearranged by the stream converter 106. In the case of a (4:2:2) component signal, one macro block is composed of four DCT blocks ($Y_1$, $Y_2$, $Y_3$, and $Y_4$) of a luminance signal Y, two DCT blocks ($Cb_1$ and $Cb_2$) of a chrominance signal Cb, and two DCT blocks ($Cr_1$ and $Cr_2$) of a chrominance signal Cr.

Figure 8A:
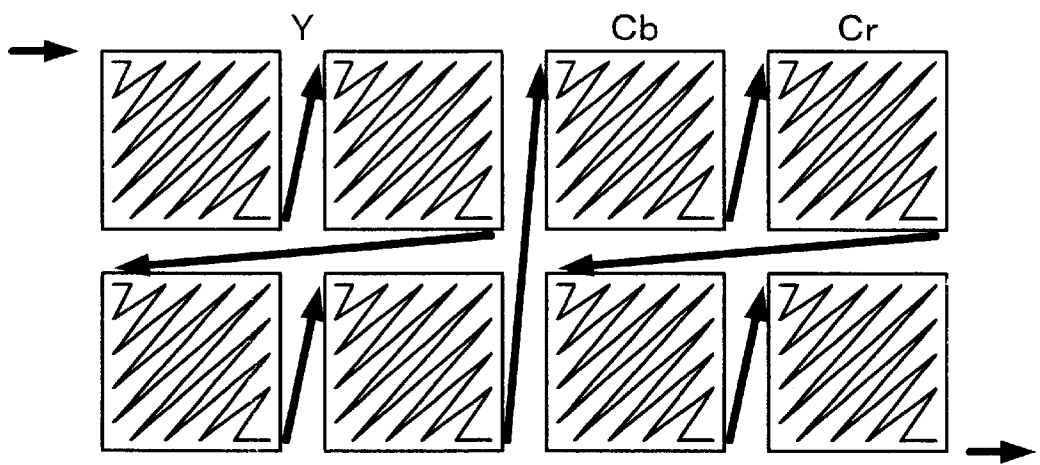
FIGS. 8A and 8B are schematic diagrams for explaining a rearrangement of output data of the video encoder.

As described above, the video encoder 102 zigzag-scans DCT coefficients in the order from a DC component to higher frequency components for each DCT block corresponding to the MPEG2 standard as shown in FIG. 8A. After the video encoder 102 has zigzag-scanned DCT coefficients for one DCT block, the video encoder 102 zigzag-scans DCT coefficients for the next DCT block so as to arrange the DCT coefficients.

In other words, DCT coefficients of each of the DCT blocks $Y_1$, $Y_2$, $Y_3$, and. $Y_4$ and the DCT blocks $Cb_1$, $Cr_1$, $Cb_2$, and $Cr_2$ of the macro block are arranged in the order from the DC component to higher frequency components. The variable-length code encoding process is performed in such a manner that codes are designated to sets of runs and levels that follow (for example, DC, $AC_1$, $AC_2$, $AC_3$, ... )

Figure 8B:
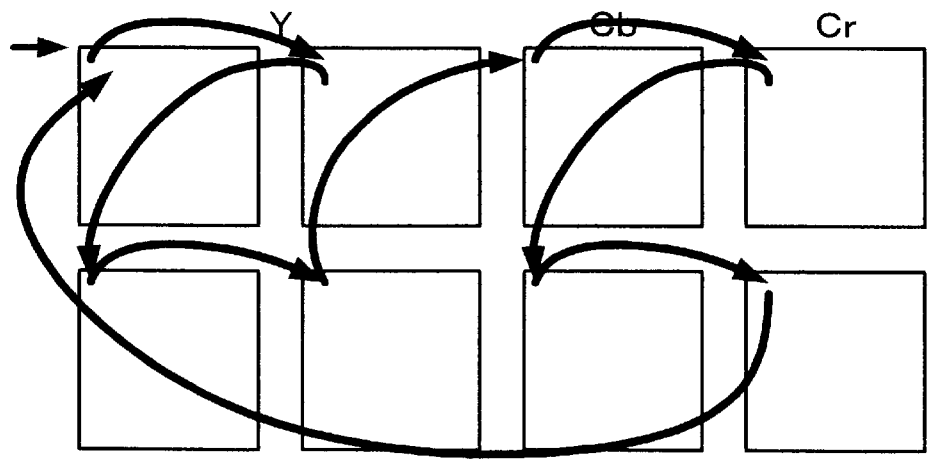

The stream converter 106 interprets a variable length code of DCT coefficients, detects ends of individual coefficients, and arranges the coefficients corresponding to the individual frequency components of the DCT blocks of the macro block. FIG. 8B shows such a rearranging process. First of all, DC components of eight DCT blocks of the macro block are collected. Next, the lowest frequency AC coefficient components of the eight DCT blocks of the macro block are collected. Thereafter, the next lowest frequency AC coefficient components of the eight DCT blocks of the macro block are collected. In such a manner, coefficient data is rearranged for eight DCT blocks so that AC coefficients corresponding to individual orders are collected.

Rearranged coefficients are $DC(Y_1)$, $DC(Y_2)$, $DC(Y_3)$, $DC(Y_4)$, $DC(Cb_1)$, $DC(Cr_1)$, $DC(Cb_2)$, $DC(Cr_2)$, $AC_1(Y_1)$, $AC_1(Y_2)$, $AC_1(Y_3)$, $AC_1(Y_4)$, $AC_1(Cb_1)$, $AC_1(Cr_1)$, $AC_1(Cb_2)$, $AC_1(Cr_2)$, ... (where DC, $AC_1$, $AC_2$, ... represent variable length code symbols designated sets of runs and levels that follow as shown in FIG. 7).

A converted elementary stream of which coefficient data has been rearranged by the stream converter 106 is supplied to the packing and shuffling portion 107. The length of data of a macro block of a converted elementary stream is the same as that of a macro block of a non-converted elementary stream. In the video encoder 102, even if the length of each GOP (one frame) is fixed by a bit-rate controlling operation, the length of each macro block is varied. The packing and shuffling portion 107 packs data of a macro block to a fixed area.

FIG. 9 shows a packing process for macro blocks performed by the packing and shuffling portion 107. Macro blocks are packed in a fixed area having a predetermined data length. The data length of the fixed area is matched with the length of one sync block that is the minimum unit of data that is recorded and reproduced. Thus, the shuffling process and the error correction code encoding process can be simplified. In FIG. 9, it is assumed that one frame contains eight macro blocks.

Figure 9A:
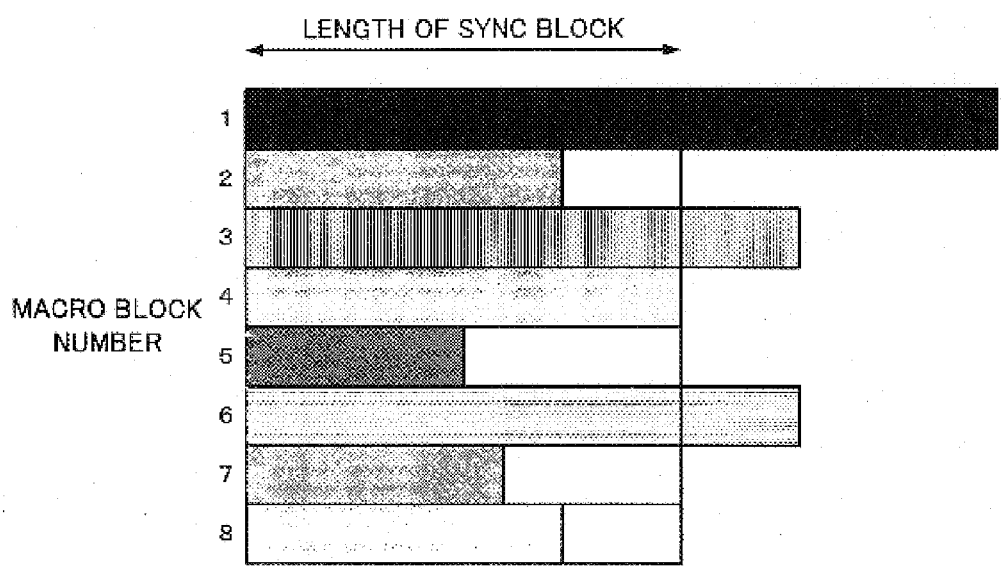
FIGS. 9A and 9B are schematic diagrams for explaining a process for packing rearranged data to sync blocks.

As shown in FIG. 9A, in the variable length code encoding process, the lengths of the individual macro blocks are different from each other. In this example, the length of each of data of macro block #1, data of macro block #3, data of macro block #6 is larger than the length of one sync block as the fixed area. On the other hand, the length of each of data of macro block #2, data of macro block #5, data of macro block #7, and data of macro block #8 is smaller than the length of one sync block. The length of data of macro block #4 is almost equal to the length of data of one sync block.

Figure 9B:
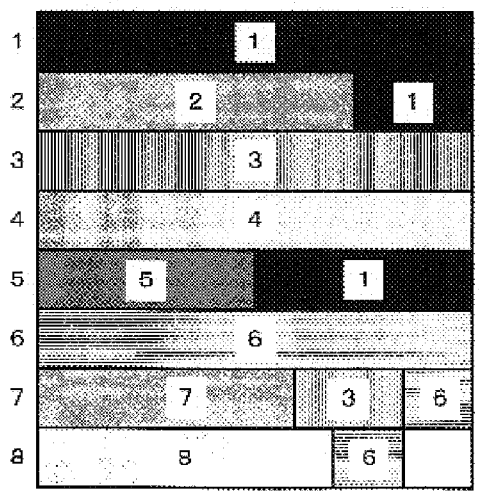

In the packing process, each macro block is packed in the fixed area with the length of one sync block. This is because the data amount generated in one frame period is controlled to a fixed amount. As shown in FIG. 9B, a macro block longer than one sync block is divided at the position corresponding to the length of one sync block. The overflow portion of the macro block against the length of one sync block is packed to the rear blank portions of the other macro blocks each of which is shorter than the length of one macro block.

In the example shown in FIG. 9B, the overflow portion of macro block #1 against the length of one sync block is packed to the rear blank portion of macro block #2. When the length of macro block #2 and the overflow portion of macro block #1 exceeds the length of one sync block, the remaining overflow portion of macro block #1 is packed to the rear blank portion of macro block #5. Next, the overflow portion of macro block #3 is packed to the rear blank portion of macro block #7. In addition, the overflow portion of macro block #6 is packed to the rear blank portion of macro block #7. The further overflow portion of macro block #6 is packed to the rear blank portion of macro block #8. In such a manner, the individual macro blocks are packed to the fixed area with the length of one sync block.

The stream converter 106 can predetermine the length of each macro block. Thus, the packing portion 107 can detect the last end of data of each macro block without need to decode VLC data and check the contents thereof.

Figure 10A:
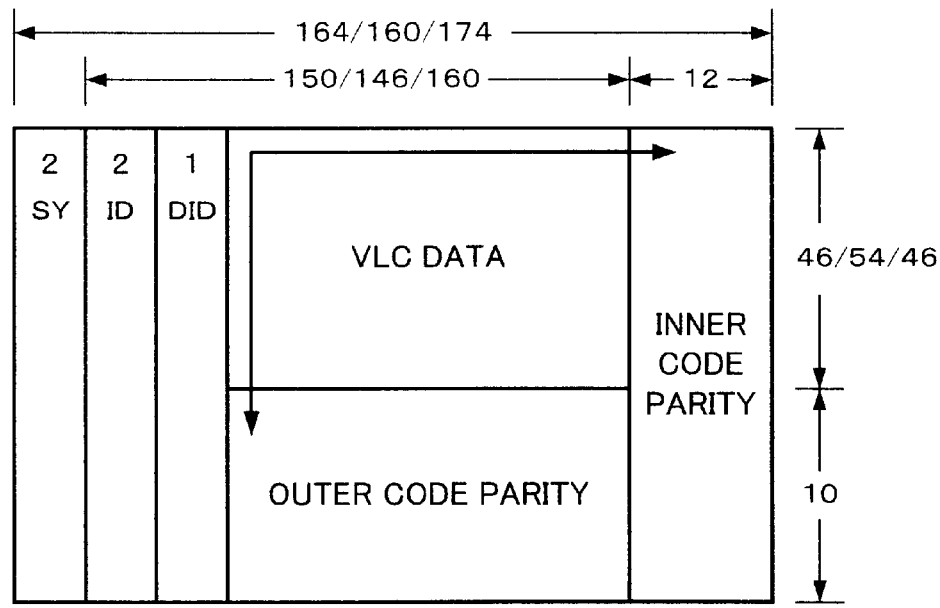
FIGS. 10A and 10B are schematic diagram for explaining an error correction code encoding process for video data and audio data.
Figure 10B:
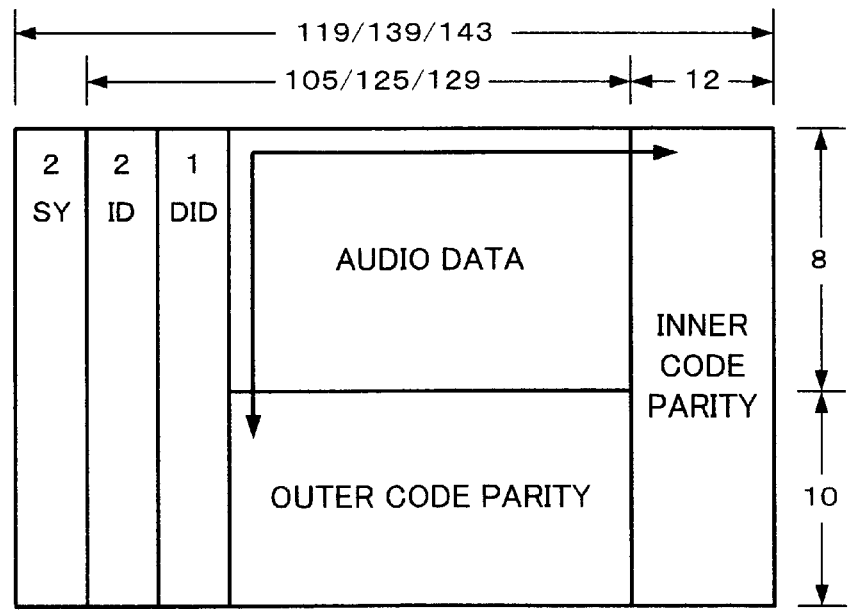

FIGS. 10A and 10B show examples of error correction codes used in the recording and reproducing apparatus. FIG. 10A shows one error correction block of error correction codes for video data. FIG. 10B shows one error correction block of error correction codes for audio data. In FIG. 10A, VLC data is data received from the packing and shuffling portion 107. A SYNC pattern, an ID, and a DID are added to each line of the VLC data. In addition, an inner code parity is added to each line of the VLC data. Thus, one sync block is formed.

In other words, a 10-byte outer code parity is composed of a predetermined number of symbols (bytes) arranged in the vertical direction of the VLC data. An inner code parity is composed of a predetermined number of symbols (bytes) of the ID, the DID, and the VLC data (or the outer code parity) arranged in the horizontal direction of the outer code parity. In the example shown in FIG. 10A, 10 outer code parity symbols and 12 inner code parity symbols are added. As a real error correction code, Reed Solomon code is used. In FIG. 10A, the length of VLC data in one sync block varies because the frame frequencies of video data vary as in 59.94 Hz, 25 Hz, and 23.976 Hz.

As with video data, as shown in FIG. 10B, a product code for audio data is used to generate 10 outer code parity symbols and 12 inner code parity symbols. In the case of audio data, the sampling frequency is for example 48 kHz. One sample is quantized to 16 bits. Alternatively, one sample may be quantized to other than 16 bits (for example, 24 bits). Corresponding to the frame frequency, the data amount of audio data in one sync block varies. As was described above, audio data for one field per channel composes two error correction blocks. One error correction block contains odd-numbered or even-numbered audio samples and audio AUX.

FIGS. 11A to 11D, 12A to 12D, and 13A to 13D show examples of video data displayed corresponding to the flag TFF according to the present invention. FIGS. 11A, 11B, 11C, and 11D show an example of which interlaced video data is reproduced in the same direction on the time axis as the recording operation. In FIGS. 11A to 11D, a plane that flies from the lower left to the upper right is displayed on the screen. FIGS. 12A, 12B, 12C, and 12D show an example of which interlaced video data shown in FIGS. 11A, 11B, 11C, and 11D is reproduced in the different direction on the time axis from the recording operation according to a conventional controlling process. FIGS. 13A, 13B, 13C, and 13D show an example of which interlaced video data is reproduced in the different direction on the time axis from the recording operation according to a controlling process of the present invention. In the following description, a reproducing operation of which recorded video data is reproduced in the different direction on the time axis from the recording operation is referred to as "reverse reproducing operation". Thus, a reproducing operation of which recorded video data is reproduced n the same direction on the time axis as the recording operation is referred to as "forward reproducing operation"

In FIGS. 11A to 11D that shows an example of which video data is reproduced in the forward direction, the flag TFF is set to [1]. As shown in FIG. 11A, a frame picture 10 is composed of a top field picture 10A and a bottom field picture 10B. A frame picture 11 that is chronologically preceded by the frame picture 10 is composed of a top field picture 11A and a bottom field picture 11B. Likewise, a frame picture 12 that is chronologically preceded by the frame picture 11 is composed of a top field picture 12A and a bottom field picture 12B.

Thus, in the example of which the value of the flag TFF is [1], as the result of the MPEG2 decoding process, the field pictures 10A, 10B, 11A, 11B, 12A, and 12B are successively output. As shown in FIGS. 11B, with frame pictures 10C, 11C, and 12C, a plane that flies from the lower left to the upper right is displayed. FIG. 11C shows the display order of fields of each frame. Thus, as a result, as with a picture 13 shown in FIG. 11D, a plane that flies from the lower left to the upper right is displayed.

In the structure shown in FIG. 2, the MPEG2 decoding process is performed by the video decoder 142.

Figure 12A:
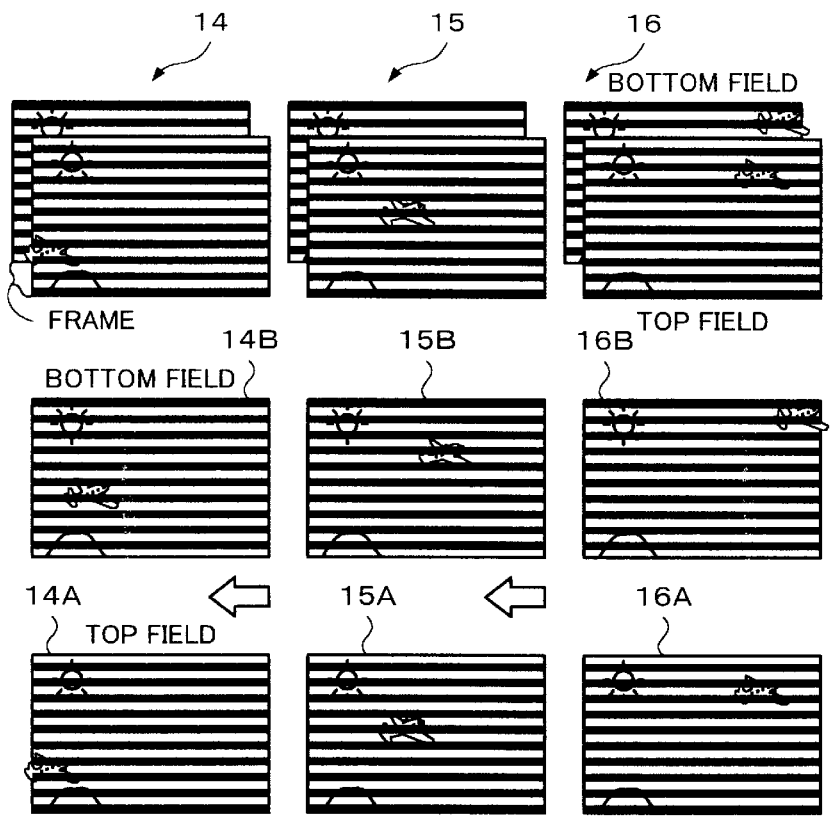
FIGS. 12A, 12B, 12C, and 12D are schematic diagrams showing an example of which interlaced video data is reproduced in the different direction on the time axis from the recording operation according to a conventional controlling method.

As described above, in the example shown in FIGS. 12A to 12D, the controlling process with the flag TFF is not used. FIG. 12A shows the structures of a top field and a bottom field of each frame. Conventionally, video data is not recorded on a magnetic tape corresponding to MPEG2. Thus, the flag TFF is been used in the reverse reproducing operation. Consequently, in the example shown in FIGS. 12A to 12D, the flag TFF is set to [1].

In the example shown in FIGS. 12A to 12D, since the reverse reproducing operation is performed, frame pictures are reproduced in the reverse order of those shown in FIGS. 11A to 11D. In other words, in the example shown in FIG. 12B, a frame picture 16 is followed by a frame picture 15. The frame picture 15 is followed by a frame picture 14.

On the other hand, since the value of the flag TFF is [1], field pictures are reproduced in the same order as the forward reproducing operation. FIG. 12C show the display order of fields of each frame. In a frame picture 16, a top field picture 16A is followed by a bottom field picture 16B.

Likewise, in a frame picture 15, a top field picture 15A is followed by a bottom field picture 15B. In a frame picture 14, a top field picture 14A is followed by a bottom field picture 14B.

Figure 12B:
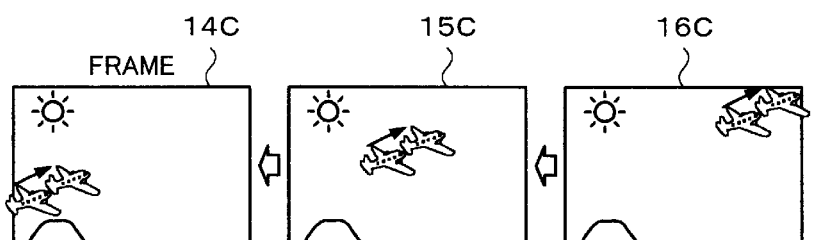
Figure 12C:
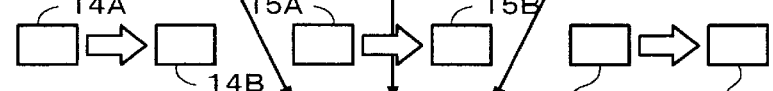
Figure 12D:

Thus, with frame pictures 16C, 15C, and 14C shown in FIG. 12B, a plane that flies from the lower left to the upper right is displayed. As a result, as shown in FIG. 12D, with a frame picture 17, a plane that flies from the upper right to the lower left is displayed. In each frame, the plane that flies from the lower left to the upper right is displayed. Thus, the plane is unnaturally displayed.

To prevent such a problem, according to the present invention, when the reverse reproducing operation is performed, the value of the flag TFF is changed to [0]. Thus, as was described above, field pictures that are output in the MPEG2 decoding process are displayed in such a manner that the bottom field is followed by the top field.

Thus, as show in FIG. 13B, since the reverse reproducing operation is performed, a frame picture 20 is displayed at first. The frame picture 20 is followed by a frame picture 19. The frame picture 19 is followed by a frame picture 18. In each of the frame pictures 20, 19, and 18, a bottom field picture is followed by a top field picture. In other words, as shown in FIG. 13C, in the frame picture 20, a bottom field picture 20B is followed by a top field picture 20A. In the frame picture 19, a bottom field picture 19B is followed by a top field picture 19A. In the frame picture 18, a bottom field picture 18B is followed by a top field picture 18A.

With frame pictures 20C, 19C, and 18C shown in FIG. 13C, a plane that flies from the upper right to the lower left is displayed. As a result, as with a picture shown in FIG. 13D, a plane that flies from the upper right to the lower left is displayed. Thus, video data is smoothly displayed in the reverse reproducing operation.

In the above description, when the reverse reproducing operation is performed, the flag TFF is set to [0]. Actually, however, whenever the reverse reproducing operation is performed, the value of the flag TFF is inverted. In other words, when video data with flag TFF=[1] is reproduced in the reverse direction, the value of the flag TFF is changed to [0]. When video data with flag TFF=[0] is reproduced in the reverse direction, the value of the flag TFF is changed to [1].

For example, video data that has been recorded in the forward direction is reproduced in the reverse direction by an external VCR or the like. The bit stream of the video data that has been compression-encoded and reversely reproduced is supplied to the VCR according to the embodiment of the present invention. At this point, the value of the flag TFF is [0]. In the VCR, the bit stream that has been compression-encoded is recorded to a magnetic tape. Of course, the bit stream is recorded on the magnetic tape that is traveled in the forward direction. At this point, the value of the flag TFF is [0]. When video data is reproduced from the tape in the forward direction and each frame is displayed in the order of the bottom field and the top field, the video data is smoothly displayed in the reverse direction.

When video data is reproduced from the tape in the reverse direction, the flag TFF is inverted once again. Thus, the value of the flag TFF is changed from [0] to [1]. Consequently, in each frame, video data is displayed in the order of the top field and the bottom field. Thus, the video data is normally displayed in the forward direction.

When the reverse reproducing operation is correlated with the value [0] of the flag TFF, if video data that has been reproduced and recorded to a tape in the reverse direction is reproduced therefrom in the reverse direction, the value of the flag TFF becomes [0]. Thus, in each frame, the bottom field is followed by the top field. Consequently, video data is unnaturally reproduced.

Thus, according to the present invention, when the reverse reproducing operation is performed, "top_field_first" contained in "picture_coding_extension" of the MPEG2 bit stream is inverted and the MPEG2 decoder is informed of the resultant flag. Corresponding to the information of "top_field_first", the MPEG2 decoder changes the display order of the top field and the bottom field.

The MPEG2 decoder has a frame memory for decoding video data that has been inter-frame encoded. The display order is changed corresponding to the flag TFF with the frame memory.

In other words, according to the present invention, with the flag TFF of one bit defined in the MPEG2 bit stream, the display order of fields can be properly controlled in the forward reproducing operation and the reverse reproducing operation for each frame (each picture).

Figure 14:
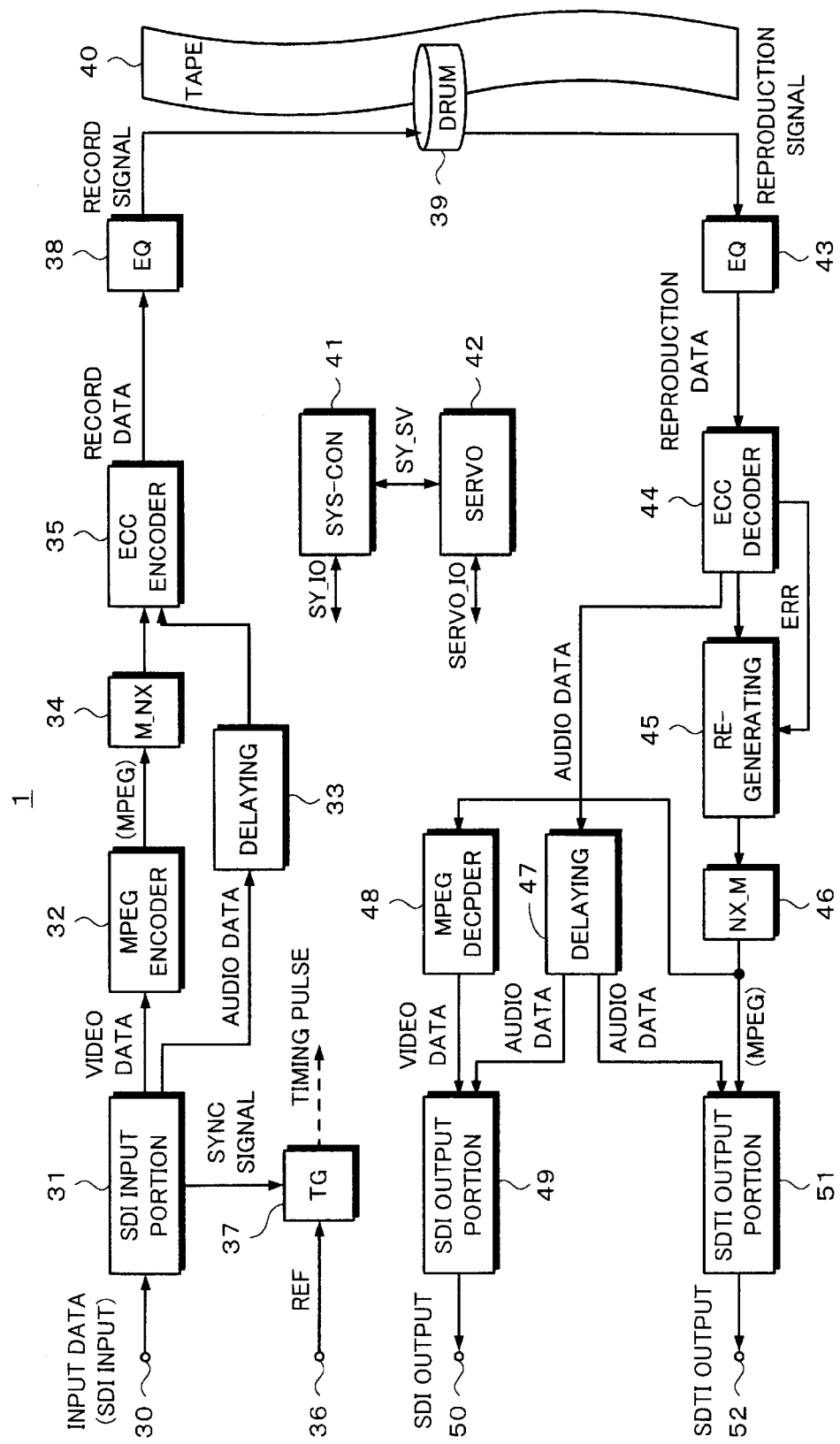
FIG. 14 is a block diagram showing an example of the structure of a VCR according to an embodiment of the present invention.

FIG. 14 is a block diagram showing an example of the structure of a VCR 1 that processes the flag TFF according to an embodiment of the present invention. In a recording section of the VCR 1, video data and audio data in for example SDI (Serial Digital Interface) transmission format are input to a terminal 30. The SDI format is a transmission format of which video data and audio data are multiplexed and serially transmitted. The SDI format is defined in SMPTE-259M for broadcast stations and so forth. The data that is input from the terminal 30 is supplied to an input circuit 31. The input circuit 31 converts the serial data into eight-bit wide parallel data. The input circuit 31 separates the parallel data into video data and audio data. In addition, the input data 31 extracts a synchronous signal as a phase reference from the input data.

The video data is supplied to an MPEG encoder 32. The audio data is supplied to a delaying circuit 33. The delaying circuit 33 delays the audio data for a predetermined time period and supplies the resultant audio data to an ECC encoder 35. The synchronous signal is supplied to a timing generator 37.

An external reference signal REF is input from a terminal 36. The signal REF is supplied to a timing generator 37. The timing generator 37 outputs a timing signal necessary for the VCR 1 as timing pulses in synchronization with a designated signal of the synchronous signal and the signal REF that is received from the input circuit 31. The timing pulses TP are supplied to each portion of the VCR 1.

The MPEG encoder 32 performs a DCT process, a quantizing process, and a compression-encoding process for the video data received from the input portion 31. In addition, the MPEG encoder 32 adds MPEG header information to the resultant video data and outputs an MPEG bit stream. At this point, the value of the flag TFF is [1]. The flag TFF is placed at a predetermined position of "picture_coding_extension (hereinafter, referred to as PCE) of the MPEG bit stream structure. The position of the flag TFF in the MPEG bit stream will be described later.

In the following description, a bit stream of which predetermined header information is added to video data that has been compression-encoded corresponding to MPEG is referred to as MPEG bit stream.

The bit stream is supplied to an M_NX circuit 34. The M_NX circuit 34 re-arranges DCT coefficients of the received data in the order of the lower frequency components as was described in FIGS. 8A and 8B. The resultant bit stream of which DCT coefficients of the MPEG bit stream have been re-arranged is referred to as converted bit stream. The converted bit stream that is output from the M_NX circuit 34 is supplied to an ECC encoder 35.

In addition to the converted bit stream, the audio data that has been delayed by the delaying circuit 33 is supplied to the ECC encoder 35. In the VCR 1, the audio data is treated as non-compressed data. The delaying circuit 35 delays the audio data as the MPEG encoder 32 delays the video data so that the timing of the converted bit stream matches the timing of the audio data.

The ECC encoder 35 performs an error correction code encoding process for the converted bit stream and audio data with a product code such as Reed-Solomon code. Thus, the ECC encoder 35 generates ECC blocks as was described in FIGS. 10A and 10B. The resultant data is supplied as record data to an equalizer 38.

The equalizer 38 performs a record encoding process for the record data so that the record data can be recorded. The resultant record data is supplied to a recording head (not shown) disposed on a rotating drum 39. The recording head forms helical tracks corresponding to the record data on a magnetic tape 40. The record data is recorded in the track format shown in FIGS. 3 and 4A to 4C on the magnetic tape 40.

A system controller (hereinafter referred to as sys-con) 41 is composed of for example a microprocessor, memories, peripheral circuits, and so forth. The sys-con 41 communicates with each portion of the VCR 1. A servo 42 drives for example a capstan motor (not shown) and controls the traveling operation of the magnetic tape 40. The servo 42 and the sys-con 41 communicate with each other using a signal SY_SV. The servo 42 and the sys-con 41 communicate with each portion of the VCR 1 using signals SERVO_IO and SY_IO and optimally control the VCR 1.

For example, with an operation panel of the VCR 1, a forward reproduction command or a reverse reproduction command are issued to the sys-con 41. Corresponding to the received command, the sys-con 41 communicates with the servo 42 using the signal SY_SV. Thus, when the received command is the reverse reproduction command, the sys-con 41 drives and controls the servo 42 so as to travel the magnetic tape 40 in the different direction from the recording operation (namely, in the reverse direction). As the reverse reproducing operation, the sys-con 41 outputs a command for inverting the flag TFF to an NX_M circuit 46 (that will be described later).

Next, a reproducing section of the VCR 1 will be described. Corresponding to a command received from the sys-con 41, the servo 42 drives the magnetic tape 40 to travel in a predetermined direction. When the forward reproduction command is received from the sys-con 41, the servo 42 drives the magnetic tape 40 to travel in the same direction as the recording operation. Likewise, when the reverse reproduction command is received from the sys-con 41, the servo 42 drives the magnetic tape 40 to travel in the different direction from the recording operation (namely, in the reverse direction). A reproducing head (not shown) disposed on the rotating drum 39 traces helical tracks formed on the magnetic tape 40 and outputs a reproduction signal. The reproduction signal is supplied to a reproducing equalizer 43. The reproducing equalizer 43 equalizes the phase of the reproduction signal and converts the reproduction signal into digital data. The reproduced data is supplied to an ECC decoder 44.

The ECC decoder 44 decodes each ECC block of reproduced data that has been encoded with error correction code.

Video data of the decoded data is a converted bit stream of which DCT coefficients are re-arranged in the order of the lower frequency components. On the other hand, music data of the decoded data is non-compressed data. The converted bit stream is supplied to a re-generating circuit 45. When the converted bit stream contains an error that has not been corrected with the error correction code, a signal ERR that represents a data bock containing the error is output. The signal ERR is supplied to the regenerating circuit 45.

When the re-generating circuit 45 receives the signal ERR that represents that the reproduction data does not have an error, the re-generating circuit 45 obtains header information from each frame of the converted bit stream. When the re-generating circuit 45 receives the signal ERR that represents that the reproduced data has an error, the re-generating circuit 45 re-structures the header information using information that the re-generating circuit 45 has just obtained. The re-generating circuit 45 holds information of each frame. When the reproduction data has an error, the re-generating circuit 45 corrects an error portion of the MPEG bit stream using the preceding frame. The converted bit stream that has been corrected by the re-generating circuit 45 is supplied to the NX_M circuit 46.

The NX_M circuit 46 re-arranges DCT coefficients of the converted bit stream into an MPEG bit stream. At this point, the NX_M circuit 46 extracts the flag TFF from the converted bit stream. In addition, when the reverse reproducing operation is performed, the NX_M circuit 46 inverts the flag TFF and places it in the converted bit stream. The flag TFF extracting method performed by the NX_M circuit 46 will be described later.

When the sys-con 41 causes the servo 42 to perform the reverse reproducing operation, as was described above, the sys-con 41 supplies a command for inverting the flag TFF to the NX_M circuit 46. Corresponding to the timing of which frames of the converted bit stream that have been reversely reproduced are supplied to the NX_M circuit 46, the command is delayed and supplied to the NX_M circuit 46. Corresponding to the command, the NX_M circuit 46 inverts the flag TFF placed at the predetermined position of the converted bit stream.

The MPEG bit stream that is output form the NX_M circuit 46 is supplied to an SDTI output portion 51 and an MPEG decoder 48. The MPEG decoder 48 decodes and expands the received MPEG bit stream and outputs non-compressed video data. At this point, corresponding to the value of the flag TFF placed in the MPEG bit stream, the output order of the top field and the bottom field can be controlled for each frame. This controlling operation can be performed using the frame memory of the MPEG decoder 48. Although the frame memory is used to decode video data that has been encoded in motion compensation predictive encoding process, the frame memory can be used to change the read order of fields. An output signal of the MPEG decoder 48 is supplied to an SDI output portion 49.

On the other hand, the audio data that has been decoded by the ECC decoder 44 is supplied to a delaying circuit 47. The delaying circuit 47 delays the audio data for a predetermined time period. The delayed audio data is supplied to an SDI output portion 49 and an SDTI output portion 51. The delaying circuit 47 delays the audio data that is supplied to the SDI output portion 49 for a time period corresponding to the process time of the video data in the re-generating circuit 45, the NX_M circuit 46, and the MPEG decoder 48. In addition, the delaying circuit 47 delays the audio data supplied to the SDTI output portion 51 for a time period corresponding to the process time of the video data in the re-generating circuit 45 and the NX_M circuit 46.

The SDI output portion 49 formats the received video data and audio data as SDI transmission data, converts parallel data into serial data, and outputs the serial data to an output terminal 50.

Likewise, the SDTI output portion 51 formats the received MPEG bit stream and audio data as SDTI (Serial Data Transform Interface) transmission data, converts parallel data into serial data, and outputs the serial data to an output terminal 52. Since the MPEG bit stream supplied to the SDTI output portion 51 contains the flag TFF, a receiving device can control the reproduction order of the top field and the bottom field of each frame corresponding to the value of the flag TFF.

The SDTI transmission format is a transmission format defined in SMPTE-305M for broadcast stations and so forth.

Figures 15A, 15B:
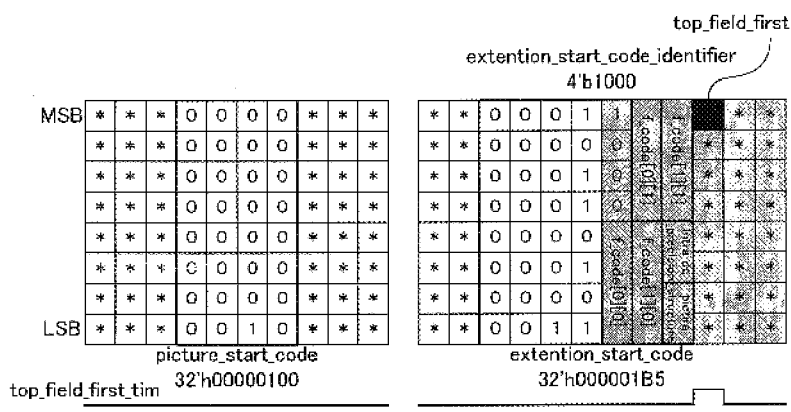
FIGS. 15A and 15B are schematic diagrams showing a part of the header structure of an MPEG bit stream.

Next, a process for placing the flag TFF in an MPEG data stream and a process for extracting the flag TFF therefrom will be described. The flag TFF extracting process is performed by the NX_M circuit 48. FIG. 15A shows the structure of PCE in the case of an eight-bit bus (namely, the data width is eight bits). In FIG. 15A, the position of the flag TFF (top_field_first) in PCE is represented. As shown in FIG. 15A, "picture_start_code" (hereinafter referred to as PSC) is a code placed at the beginning of each frame. The value of PSC is [32' h00000100]. PSC is followed by "extension_start_code" (hereinafter referred to as ESC) and "extension_start_code_identifier" (hereinafter referred to as ESCI). When the value of ESC and the value of ESCI are [32' h0000001B5] and [4' b1000], respectively, it is recognized that ESCI is followed by PCE. At one bit of the MSB of the last third byte of ESCI, the flag TFF is placed.

In the above description, [32' h] represents a 32-bit code in hexadecimal notation, whereas [4' h] represents a 4-bit code in binary notation.

Figure 16:
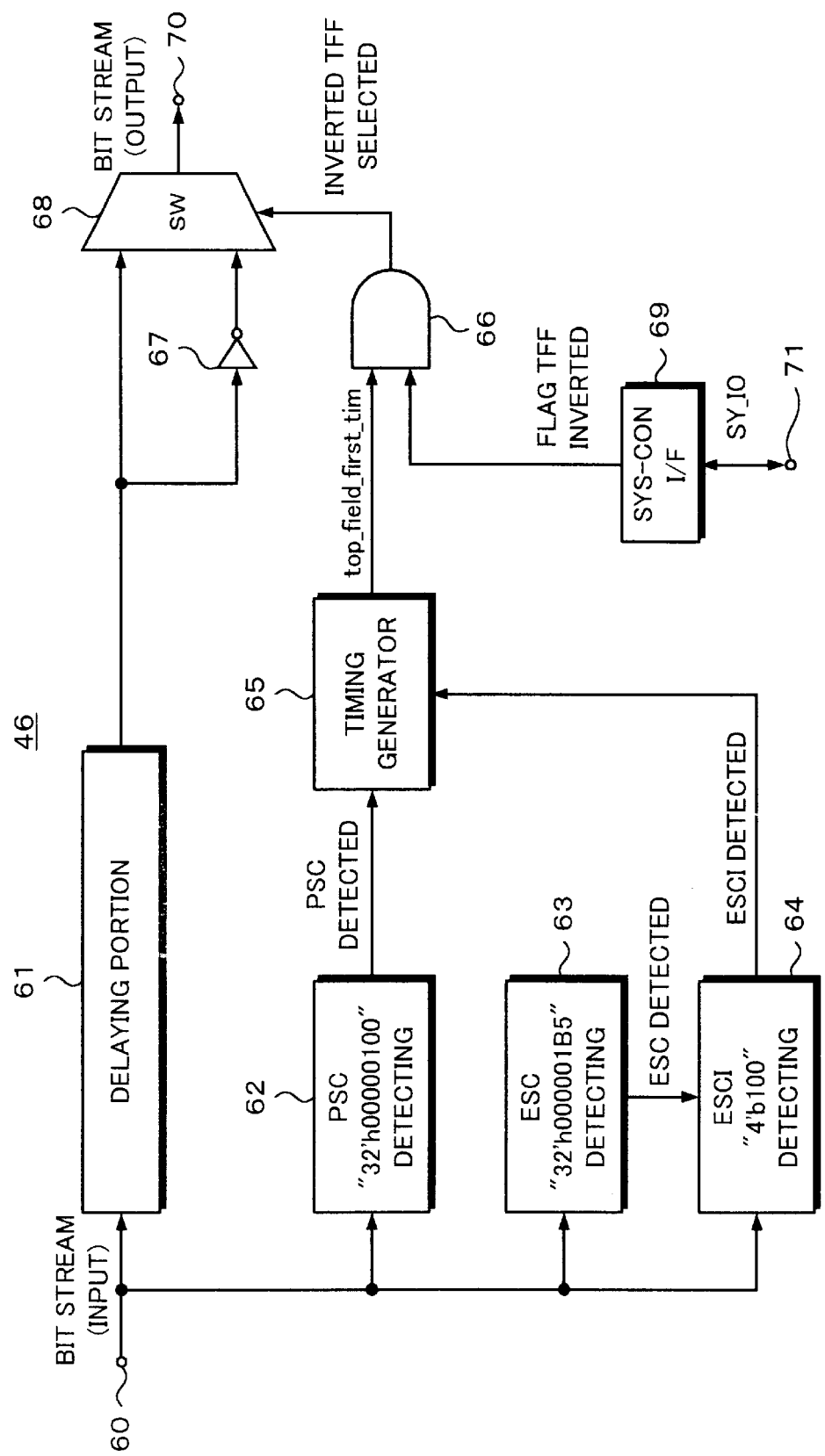
FIG. 16 is a block diagram showing the structure for extracting a flag TFF.

FIG. 16 is an example showing the structure of the NX_M circuit 46 shown in FIG. 14. In FIG. 16, a re-arranging circuit that re-arranges DCT coefficients is omitted. The re-arranging circuit (not shown) re-arranges DCT coefficients of the converted bit stream and outputs a bit stream corresponding to MPEG (hereinafter referred to as MPEG bit stream). An eight-bit parallel MPEG bit stream is input to a terminal 60. The MPEG bit stream is supplied to a delaying portion 61. In addition, the MPEG bit stream is supplied to a PSC detecting circuit 62, an ESC detecting circuit 63, and an ESCI detecting circuit 64.

The delaying portion 61 delays the input bit stream for a time period corresponding to the process time of the detecting circuits 62, 63, and 64.

A detected result of the PSC detecting circuit 62 is supplied to a timing generator 65. A detected result of the ESC detecting circuit 63 is supplied to the ESCI detecting circuit 64. The ESCI detecting circuit 64 detects ESCI corresponding to the detected result of the ESC detecting circuit 63. A detected result of the ESCI detecting circuit 64 is supplied to a timing generator 65. As shown in FIG. 15B, the timing generator 65 generates a timing signal "top_field_first_tim" (hereinafter referred to as TFFT) corresponding to the detected results of the PSC detecting circuit 62 and the ESCI detecting circuit 64. With the signal TFFT, the flag TFF can be extracted from the MPEG bit stream.

Figure 17:
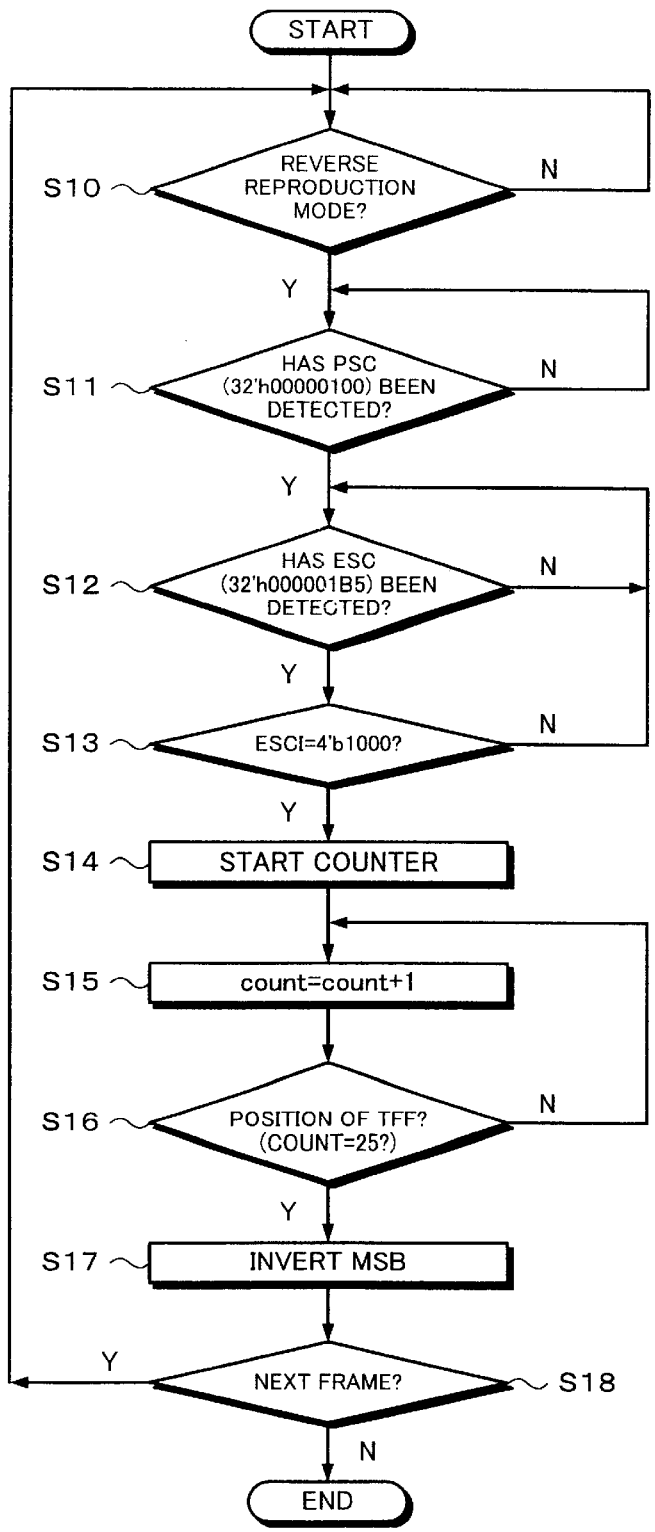
FIG. 17 is a flow chart showing an example of a process for extracting and inverting the flag TFF.

FIG. 17 is a flow chart showing an example of a process for extracting and inverting the flag TFF. When the VCR 1 is operated in the reverse reproduction mode corresponding to the reverse reproduction command (at step S10), the PSC detecting circuit 62 detects PSC (at step S11). For example, the PSC detecting circuit 62 simultaneously checks four bytes (32 bits) of the eight-bit parallel MPEG bit stream and detects a value [32' H0000100] that represents PSC. The detected result of PSC is supplied to the timing generator 85.

After PSC is detected, the flow advances to step S12. At step S12, the ESC detecting circuit 63 detects ESC. As with the PSC detecting circuit 62, the ESC detecting circuit 63 simultaneously checks four bytes of the eight-bit parallel MPEG bit stream, detects a value [3' h000001B5] that represents ESC, and supplies the detected result to the ESCI detecting circuit 64.

When the ESC detecting circuit 63 has supplied the detected result of ESC to the ESCI detecting circuit 64, the flow advances to step S13. At step S13, the ESCI detecting circuit 64 detects ESCI. For example, the ESCI detecting circuit 64 checks the high order four bits of the eight-bit parallel MPEG bit stream and detects a value [4' b0001] that represents ESCI and supplies the detected result of ESCI to the timing generator 65.

The timing generator 65 has a counter that counts up corresponding to each byte of the MPEG bit stream. When the ESCI detecting circuit 64 has supplied the detected result of ESCI to the timing generator 65, the flow advances to step S14. At step S14, the counter is reset. Thereafter, the flow advances to step S15. At step S15, the counter counts up corresponding to each byte of the MPEG bit stream.

As shown in FIG. 15A, the flag TFF is placed at the MSB of the last third byte of ESCI. Thus, when the last third byte of ESCI is counted, the signal TFFT shown in FIG. 15B is output (at step S16). As shown in FIG. 15B, the signal level of the signal TFFT becomes high at a timing corresponding to the positon of the flag TFF.

The timing at which the signal TFFT is output depends on the width of the bus with which the MPEG bit stream is transmitted. In the example of which the bus width is eight bits, the signal TFFT is output at the last fourth clock pulse of ESC.

On the other hand, a sys-con I/F 69 that is an interface between the sys-con 41 and the NX_M circuit 46 communicates with the sys-con 41 through a terminal 71 using a signal SY_IO. When the VCR 1 performs a reverse reproducing operation and the sys-con 41 outputs the flag TFF inversion command, the sys-con I/F 69 outputs a flag inversion signal that causes the value of the bit of the flag TFF to be inverted. When the signal level of the flag TFF inversion signal becomes high, the bit inversion command is issued.

An AND circuit 66 ANDes the signal TFFT received from the timing generator 65 and the flag TFF inversion signal received from the sys-con I/F 69. Thus, when both the signal levels of the signal TFFT and the flag TFF inversion signal are high, the ANDed result is output as the inverse TFF selection signal from the AND circuit 66.

A switch circuit 68 selects one of two input terminals corresponding to the inverse TFF selection signal. The MPEG bit stream that is output from the delaying portion 61 is supplied to the first input terminal of the switch circuit 68. The bit stream that is output from the delaying portion 61 through an inverter 67 is supplied to the second input terminal of the switch circuit 68. The inverter 67 inputs data of for example eight bits in parallel. The inverter 67 inverts the value of only the bit corresponding to the bit position of the flag TFF. In the example of an eight-bit bus, only the value of the bit of the MSB is inverted. When the signal level of the invert TFF selection signal is high, the output of the inverter 67 is selected. Thus, in the MPEG bit stream, only the flag TFF is inverted (at step S17).

The bit stream that is output from the switch circuit 68 is extracted from a terminal 70. The bit stream is supplied to the SDTI output portion 51 and the MPEG decoder 48 through the terminal 70.

Returning to the flow chart shown in FIG. 17, at step S17, the MSB inverse control signal is output. Thereafter, at step S18, the next frame is processed.

In the above-described example, the flag TFF inverting process for the reverse reproducing operation is performed by hardware of the NX_M circuit 46. However, it should be noted that the present invention is not limited to such an example. Instead, the flag TFF inverting process can be performed by software that runs on a CPU (Central Processing Unit) corresponding to the flow chart shown in FIG. 17.

In the above-described example, as a record medium for recording an MPEG bit stream, a magnetic tape is used. However, it should be noted that the present invention is not limited to such an example. As long as an MPEG bit stream can be recorded and data can be reproduced frame by frame, any record medium can be used. For example, a hard disk, a semiconductor memory, or the like can be used.

In the above-described embodiment, video data is compression-encoded corresponding to MPEG2 and an MPEG bit stream is transmitted. However, it should be noted that the present invention is not limited to such an example. Instead, the present invention can be applied to another compression-encoding method that allows data that has been compression-encoded to be recorded and reproduced.

In the above-described example, for compressed video data that have been reversely reproduced from a record medium, the flag TFF is inverted. As a modification of the example, the case of which data that has been reversely reproduced and transmitted as compressed video data by an external device is recorded will be described. When the external device is a conventional device and the value of the flag TFF is [1] even if the reverse reproducing operation is performed, the VCR 1 inverts the value of the flag TFF and then records the video data.

In this case, when video data is reproduced in the forward direction from the record medium, since the value of the flag TFF is [0], each frame is displayed in the order of the bottom field and the top field. In other words, the video data is normally displayed in the reverse reproducing operation.

On the other hand, when video data is reproduced from the record medium in the reverse reproducing operation, the top field and the bottom field should be displayed in the same order of those in the forward reproducing operation. In other words, each frame should be displayed in the order of the top field and the bottom field. In the structure according to the present invention, when video data is reversely reproduced from the record medium, since the value of the flag TFF is inverted, in this example, the value of the flag TFF is inverted from [0] to [1]. Thus, each frame is displayed in the order of the top field and the bottom field. Consequently, video data is displayed as expected.

When video data is recorded, the flag TFF inverting process is performed by an SDTI input portion of the recording section of the structure shown in FIG. 14. An MPEG bit stream is supplied from the SDTI input portion to the M_NX circuit 34. The structure of the M_NX circuit 34 is the same as that shown in FIG. 16. Thus, the flag TFF placed at a predetermined position of the input bit stream is inverted. The bit stream with the inverted flag TFF is supplied to the ECC encoder 35. The ECC encoder 35 encodes the bit stream with error correction code. The resultant data is recorded on the magnetic tape 40 by the recording head of the drum 39 through the equalizer 38.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A data reproducing apparatus, comprising:

reproducing means for reading video data from a record medium in a different direction on the time axis from the direction in which the video data that had been recorded; and generating means for generating information representing that the video data has been read from said record medium in the different direction by inverting a flag that represents the display order of fields of the video data when the video data is read from said record medium by said reproducing means in the different direction.

2. The data reproducing apparatus as set forth in claim 1, wherein said generating means inverts the flag corresponding to each frame of the video data.

3. The data reproducing apparatus according to claim 1, wherein the video data is compression encoded.

4. The data reproducing apparatus according to claim 3, further comprising transmitting means for transmitting the video data and said flag.

5. The data reproducing apparatus according to claim 4, wherein said transmitting means transmits the video data with said flag placed therein.

6. A recording apparatus for recording video data that has been compression-encoded to a record medium, comprising:

receiving means for receiving a data stream of the video data;

inverting means for inverting a flag that represents the display order of fields of the video data, the flag being placed in the data stream; and recording means for recording the data stream with the inverted flag to the record medium.

7. The recording apparatus as set forth in claim 6, wherein said inverting means inverts the flag when the data stream supplied to said recording means has been reversely reproduced and the flag placed in the data steam does not represent the video data that has been reproduced in the reverse direction.

8. A recording and reproducing apparatus, comprising:

recording means for recording video data to a record medium;

reproducing means for reproducing the video data from the record medium in a different direction on the time axis from the direction in which the video data had been recorded; and generating means for generating information representing that the video data has been read from said record medium in the different direction by inverting a flag that represents the display order of fields of the video data when the video data is read from said record medium in the different direction.

9. The recording and reproducing apparatus as set forth in claim 8, wherein said generating means inverts the flag corresponding to each frame of the video data.

10. A data reproducing method, comprising the steps of:

reading video data from a recording medium in a different direction on the time axis from the direction in which the video data that had been recorded; and generating information representing that the video data has been read from said record medium in the different direction by inverting a flag representing the display order of fields of the video data when the video data is read from said recording medium in the different direction.

11. The data reproducing method according to claim 10, wherein the video data is compression encoded.

12. The data reproducing method according to claim 11, further comprising the step of transmitting the video data and said flag.

13. The data reproducing method according to claim 12, wherein said the video data is transmitted with said flag placed therein.

* * * * *